United States Patent
Yamamoto

(10) Patent No.: US 9,367,342 B2
(45) Date of Patent: Jun. 14, 2016

(54) OPTIMIZING A DEACTIVATION PROCESS FOR A VIRTUAL MACHINE SYSTEM

(71) Applicant: Panasonic Intellectual Property Corporation of America, Torrance, CA (US)

(72) Inventor: Tetsuji Yamamoto, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 280 days.

(21) Appl. No.: 13/817,278

(22) PCT Filed: Oct. 22, 2012

(86) PCT No.: PCT/JP2012/006736
§ 371 (c)(1),
(2) Date: Feb. 15, 2013

(87) PCT Pub. No.: WO2013/076913
PCT Pub. Date: May 30, 2013

(65) Prior Publication Data
US 2014/0089920 A1 Mar. 27, 2014

(30) Foreign Application Priority Data
Nov. 24, 2011 (JP) ................. 2011-256227

(51) Int. Cl.
*G06F 9/455* (2006.01)
*G06F 1/32* (2006.01)
*G06F 9/48* (2006.01)

(52) U.S. Cl.
CPC .......... *G06F 9/45533* (2013.01); *G06F 1/3287* (2013.01); *G06F 9/485* (2013.01); *G06F 9/4893* (2013.01); *G06F 2209/482* (2013.01); *Y02B 60/1282* (2013.01); *Y02B 60/144* (2013.01)

(58) Field of Classification Search
None
See application file for complete search history.

(56) References Cited

U.S. PATENT DOCUMENTS

| 7,844,845 B2 | 11/2010 | Chen et al. |
| 2005/0188158 A1* | 8/2005 | Schubert ................. 711/133 |

(Continued)

FOREIGN PATENT DOCUMENTS

| EP | 1 134 656 | 9/2001 |
| JP | 5-120040 | 5/1993 |

(Continued)

OTHER PUBLICATIONS

International Search Report issued Nov. 13, 2012 in International (PCT) Application No. PCT/JP2012/006736.

*Primary Examiner* — Emerson Puente
*Assistant Examiner* — Zhi Chen
(74) *Attorney, Agent, or Firm* — Wenderoth, Lind & Ponack, L.L.P.

(57) ABSTRACT

A virtual machine system includes one or more virtual machines and a deactivator that deactivates the virtual machines. Each virtual machine includes an output unit that outputs a deactivation prohibiting signal indicating that the virtual machine is not permitted to stop operating while deactivation prohibited processing is being executed. The deactivation prohibited processing is processing that involves the device and during which the virtual machine is not permitted to stop operating. The deactivator deactivates a virtual machine that has not output the deactivation prohibiting signal, and does not deactivate a virtual machine that has output the deactivation prohibiting signal.

4 Claims, 22 Drawing Sheets

(56) References Cited

U.S. PATENT DOCUMENTS

| | | |
|---|---|---|
| 2009/0144570 A1 | 6/2009 | Chen et al. |
| 2009/0172424 A1* | 7/2009 | Cai et al. .................. 713/300 |
| 2009/0204756 A1* | 8/2009 | Venturi ............... G06F 11/1441 711/112 |
| 2010/0095144 A1* | 4/2010 | Yamanaka et al. ............ 713/323 |
| 2010/0115315 A1 | 5/2010 | Davis et al. |
| 2012/0137147 A1* | 5/2012 | Myers ........................... 713/310 |
| 2012/0240107 A1* | 9/2012 | Brescia ............... G06F 11/1433 717/168 |
| 2013/0055249 A1* | 2/2013 | Vaghani et al. .................. 718/1 |

FOREIGN PATENT DOCUMENTS

| | | |
|---|---|---|
| JP | 7-78090 | 3/1995 |
| JP | 2001-43098 | 2/2001 |
| JP | 2004-362426 | 12/2004 |
| JP | 2009-140489 | 6/2009 |

* cited by examiner

FIG. 3

Control information 300

| Device control ID | Task ID | Relevant task ID |
|---|---|---|
| 009 (Sound source switching) | 16 (Task A) | 17 (Task B) |

Deactivation prohibited processing information 400

| Deactivation prohibited processing ID |
|---|
| 009 (Sound source switching) |
| 011 (ABC processing) |
| 021 (XYZ processing) |
| ⋮ |

Abnormality removal information 1200

| Deactivation prohibited processing ID 1210 | Abnormality removal ID 1220 |
|---|---|
| 005<br>(Response waiting) | 035<br>(Network disconnection) |

FIG. 17

First modified abnormality removal information 1700

| Deactivation prohibited processing ID 1710 | Abnormality removal ID 1720 |
|---|---|
| 006<br>(Data writing including update of file system management information) | 101<br>(Recovery processing) |

FIG. 21

Second modified abnormality removal information 2100

| Deactivation prohibited processing ID 2110 | Abnormality removal ID 2120 |
|---|---|
| 012<br>(Data writing) | 102<br>(Storage state recording) |

OPTIMIZING A DEACTIVATION PROCESS FOR A VIRTUAL MACHINE SYSTEM

TECHNICAL FIELD

The present invention relates to a virtual machine system for controlling the execution of a virtual machine that utilizes a device.

BACKGROUND ART

A virtual machine system for controlling the execution of a virtual machine that utilizes a device is known.

For example, Patent Literature 1 discloses a virtual machine system capable of deactivating a virtual machine. According to Patent Literature 1, when the virtual machine is executing processing involving a device, the virtual machine system does not deactivate a virtual machine until the virtual machine completes the processing.

This virtual machine system does not deactivate the virtual machine that is executing the processing involving a device. This allows the virtual machine system to safely stop the virtual machine without causing inconveniences that might happen when the virtual machine is stopped in the middle of the processing.

CITATION LIST

Patent Literature

[Patent Literature 1]
Japanese Patent Application Publication No. 2001-43098

SUMMARY OF INVENTION

Technical Problem

However, even when a user desires to deactivate the virtual machine of the virtual machine system disclosed by Patent Literature 1 in a short time, if the virtual machine is executing the processing involving a device, the virtual machine system cannot deactivate the virtual machine until the processing is completed.

The present invention has been achieved in view of the above problem, and an aim thereof is to implement a virtual machine system that is likely to safely deactivate a virtual machine thereof that uses a device in a shorter time than conventional systems.

Solution to Problem

In order to solve the above problem, a virtual machine system according to an aspect of the present invention is a virtual machine system for implement one or more virtual machines and a deactivator that deactivates the one or more virtual machines, comprising: a processor utilizing a device; and a memory storing therein a program executed by the processor, the virtual machine system causing the processor to execute the program stored in the memory to implement the one or more virtual machines and the deactivator, wherein each of the one or more virtual machines includes an output unit that outputs a deactivation prohibiting signal while the virtual machine is executing deactivation prohibited processing, the deactivation prohibited processing being processing that involves the device and during which the virtual machine is not permitted to stop operating, the deactivation prohibiting signal indicating that the virtual machine is not permitted to stop operating, and the deactivator deactivates a virtual machine among the one or more virtual machines that does not output the deactivation prohibiting signal, and does not deactivate a virtual machine among the one or more virtual machines that outputs the deactivation prohibiting signal.

Advantageous Effects of Invention

In general, processing involving a device executed by a virtual machine does not necessarily cause inconveniences when the virtual machine is stopped before completion of the processing. Therefore, even while the virtual machine is executing the processing involving a device, if the processing does not cause inconveniences when the virtual machine is stopped before completion of the processing, the inconveniences do not occur even when the virtual machine is stopped before completion of the processing.

According to the virtual machine system that is an aspect of the present invention with the above structure, even while a virtual machine is executing processing involving a device, the deactivator deactivates the virtual machine if the processing is not deactivation prohibited processing. Thus, the virtual machine system treats, as deactivation prohibited processing, only processing that might cause inconveniences when the virtual machine is stopped before completion of the processing. As a result, the virtual machine system safely deactivates a virtual machine that uses a device in a shorter time than conventional systems.

BRIEF DESCRIPTION OF DRAWINGS

FIG. 3 shows the data structure of control information 300.
FIG. 4 shows the data structure of deactivation prohibited processing information 400.
FIG. 12 shows the data structure of abnormality removal information 1200.
FIG. 17 shows the data structure of first modified abnormality removal information 1700.
FIG. 21 shows the data structure of second modified abnormality removal information 2100.

DESCRIPTION OF EMBODIMENTS

<Embodiment 1>

<Outline>

The following describes a virtual machine system for controlling the operations of one or more virtual machines that utilize a device, as an embodiment of a virtual machine system pertaining to the present invention.

This virtual machine system includes a hypervisor for controlling the operations of the virtual machines. Each of the virtual machines whose operations are controlled by the hypervisor stores therein a state flag indicating whether the virtual machine is executing predetermined deactivation prohibited processing among processing involving a device. Here, the deactivation prohibited processing is processing during which the virtual machine is not permitted to stop operating until the virtual machine completes the processing.

When the hypervisor attempts to deactivate one of the virtual machines and a state flag stored in the one virtual machine indicates that the virtual machine is not executing the deactivation prohibited processing, the hypervisor deactivates the virtual machine. In contrast, when the hypervisor attempts to deactivate one of the virtual machines and a state flag stored in the one virtual machine indicates that the virtual machine is executing the deactivation prohibited processing, the hypervisor transmits a processing time reducing signal to the virtual machine without deactivating the virtual machine. The processing time reducing signal instructs the virtual machine to reduce a time period during which the virtual machine uses a device.

Upon receiving the processing time reducing signal, the virtual machine that is executing the deactivation prohibited processing executes tasks pertaining to the deactivation prohibited processing at the highest execution priority, so as to complete the tasks in a short time. Upon completion of the deactivation prohibited processing, the virtual machine transmits a Virtual Machine (VM) deactivation prohibition canceling signal to the hypervisor. The VM deactivation prohibition canceling signal indicates that the virtual machine is now permitted to stop operating.

Upon receiving the VM deactivation prohibition canceling signal from the virtual machine, the hypervisor deactivates the virtual machine.

The following describes the structure of a virtual machine system pertaining to Embodiment 1 with reference to the drawings.

<Structure>

Figure 1:
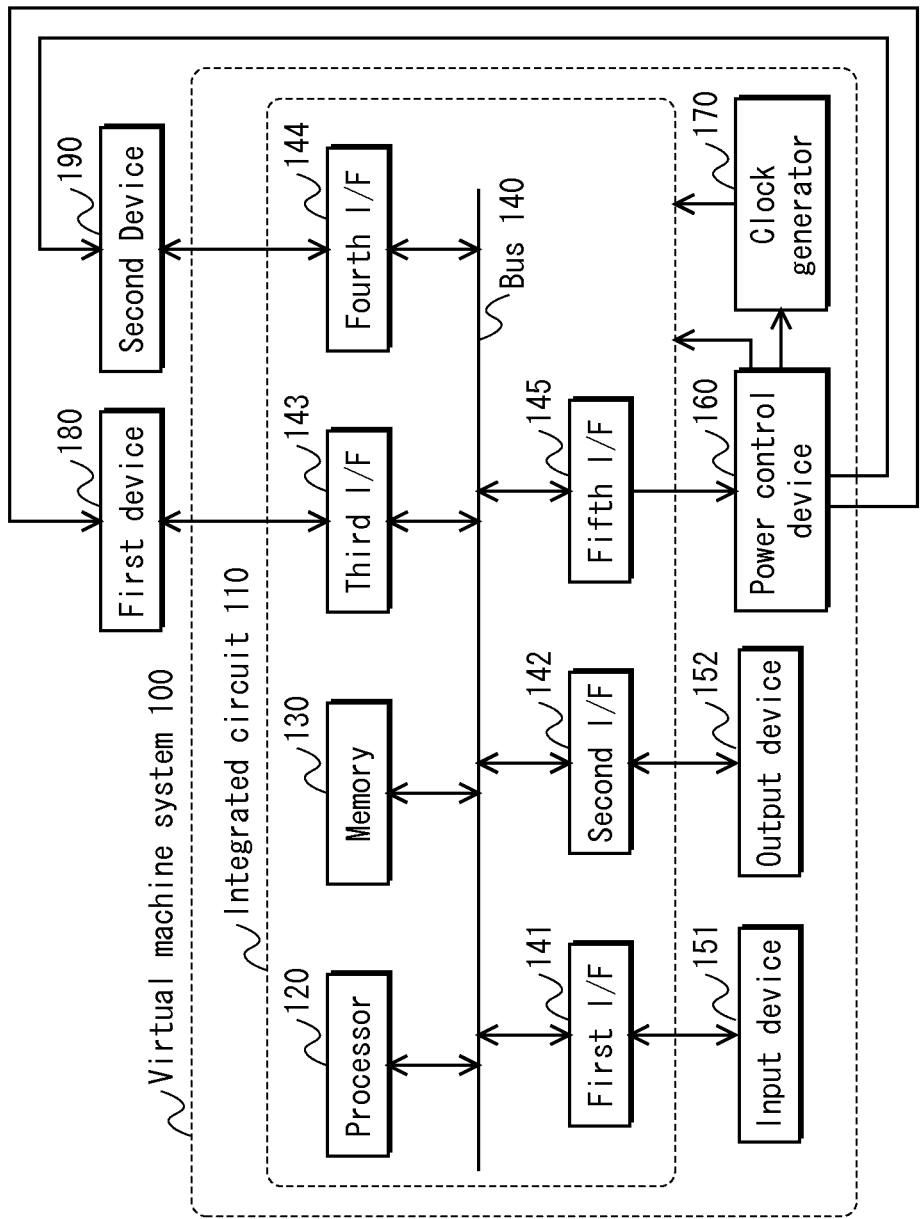
FIG. 1 is a block diagram showing the principal hardware configuration of a virtual machine system 100.

FIG. 1 is a block diagram showing the principal hardware structure of a virtual machine system 100.

As shown in FIG. 1, the hardware of the virtual machine system 100 is a computer that includes an integrated circuit 110, an input device 151, an output device 152, a power control device 160, and a clock generator 170. The virtual machine system 100 is connected to a first device 180 and a second device 190. The integrated circuit 110 includes a processor 120, a memory 130, a bus 140, a first interface (I/F) 141, a second I/F 142, a third I/F 143, a fourth I/F 144 and a fifth I/F 145.

The memory 130 is composed of Read Only Memory (ROM), Random Access Memory (RAM) and a flash memory, and connected to the bus 140. The memory 130 stores therein a program defining the operation of the processor 120, along with data used by the processor 120.

The bus 140 is connected to the processor 120, the memory 130, the first I/F 141, the second I/F 142, the third I/F 143, the fourth I/F 144 and the fifth I/F 145, transporting signals between the circuits connected thereto.

The first I/F 141, the second I/F 142, the third I/F 143, the fourth I/F 144 and the fifth I/F 145 are respectively connected to the bus 140 and the input device 151, the bus 140 and the output device 152, the bus 140 and the first device 180, the bus 140 and the second device 190, and the bus 140 and the power control device 160. The first I/F 141, the second I/F 142, the third I/F 143, the fourth I/F 144 and the fifth I/F 145 transport signals between the circuits connected thereto.

The input device 151 includes a keyboard, a mouse and the like. The input device 151 is connected to the first I/F 141, and controlled by a processor 120 that executes programs. The input device 151 receives an operation command from a user using the virtual machine system 100.

The output device 152 includes a screen and the like. The output device 152 is connected to the second I/F 142, and controlled by a processor 120 that executes programs. The output device 152 displays character sequences, images, etc., based on signals transmitted from the processor 120.

The power control device 160 is connected to the fifth I/F 145, the clock generator 170, the first device 180, the second device 190 and the integrated circuit 110, and controlled by the processor 120 that executes programs. The power control device 160 controls power supplied to circuits constituting the integrated circuit 110 (the processor 120, memory 130, etc.), controls power supplied to the first device 180, and controls power supplied to the second device 190. The power control device switches between the following first or second operation state.

First state: a state in which the power control device 160 supplies each of the circuits constituting the integrated circuit 110 (the processor 120, the memory 130, etc.) with power at a potential of a first voltage (e.g., 1.2 V), supplies the first device 180 with power at a potential of a second voltage (e.g., 3 V) suitable for the operation of the first device 180, and supplies the second device 190 with power at a potential of a third voltage (e.g., 3 V) suitable for the operation of the second device 190.

Second state: a state in which the power control device 160 does not supply power to any of the circuits constituting the integrated circuit 110 (the processor 120, the memory 130, etc.), the first device 180 or the second device 190.

Further, upon receiving a low power transition ready signal from the processor 120, the power control device 160 switches an operation state thereof from the first state to the second state. The low power transition ready signal indicates that preparation for reducing power consumption is ready.

The clock generator 170 is connected to the power control device 160 and the integrated circuit 110. When the operation state of the power control device 160 is in the first state, the clock generator 170 generates a clock signal at a first operating frequency (at which each of the circuits constituting the integrated circuit 110 can operate normally when power at a potential of the first voltage is supplied to each circuit, e.g., 1 GHz) and supplies the generated clock signal to the integrated circuit 110. When the operation state of the power control device 160 is in the second state, the clock generator 170 does not supply the clock signal to the integrated circuit 110.

The processor 120 is connected to the bus 140. The processor 120 controls the input device 151, the output device 152, the power control device 160, the clock generator 170, the first device 180 and the second device 190 by executing programs stored in the memory 130, and causes the virtual machine system 100 to function as a computer system for controlling the operations of one or more virtual machines. Here, the processor 120 controls the virtual machine system 100 by executing programs stored in the memory 130, and causes the virtual machine system 100 to execute characteristic operations of the virtual machine system 100, such as the VM deactivation requesting, the response processing, the processing time reduction, the power state switching and the device deactivation. The VM deactivation requesting, the response processing, the processing time reduction, the power state switching and the device deactivation are described in details later with reference to flowcharts.

The first device 180 is connected to the third I/F 143 and the power control device 160, and controlled by the processor 120 that executes programs. The first device 180 is an audio outputting device that operates by using power supplied from the power control device 160, for example. The first device 180 generates audio based on signals transmitted from the processor 120 and transmits the generated audio to the outside.

The second device 190 is connected to the fourth I/F 144 and the power control device 160, and controlled by the processor 120 that executes programs. The second device 190 operates with power supplied from the power control device 160. For example, the second device 190 is an external hard disk device that writes data in an internal hard disk and reads data written in the internal hard disk.

The following describes the functional structure of the virtual machine system 100 with the above hardware structure with reference to the drawings.

Figure 2:
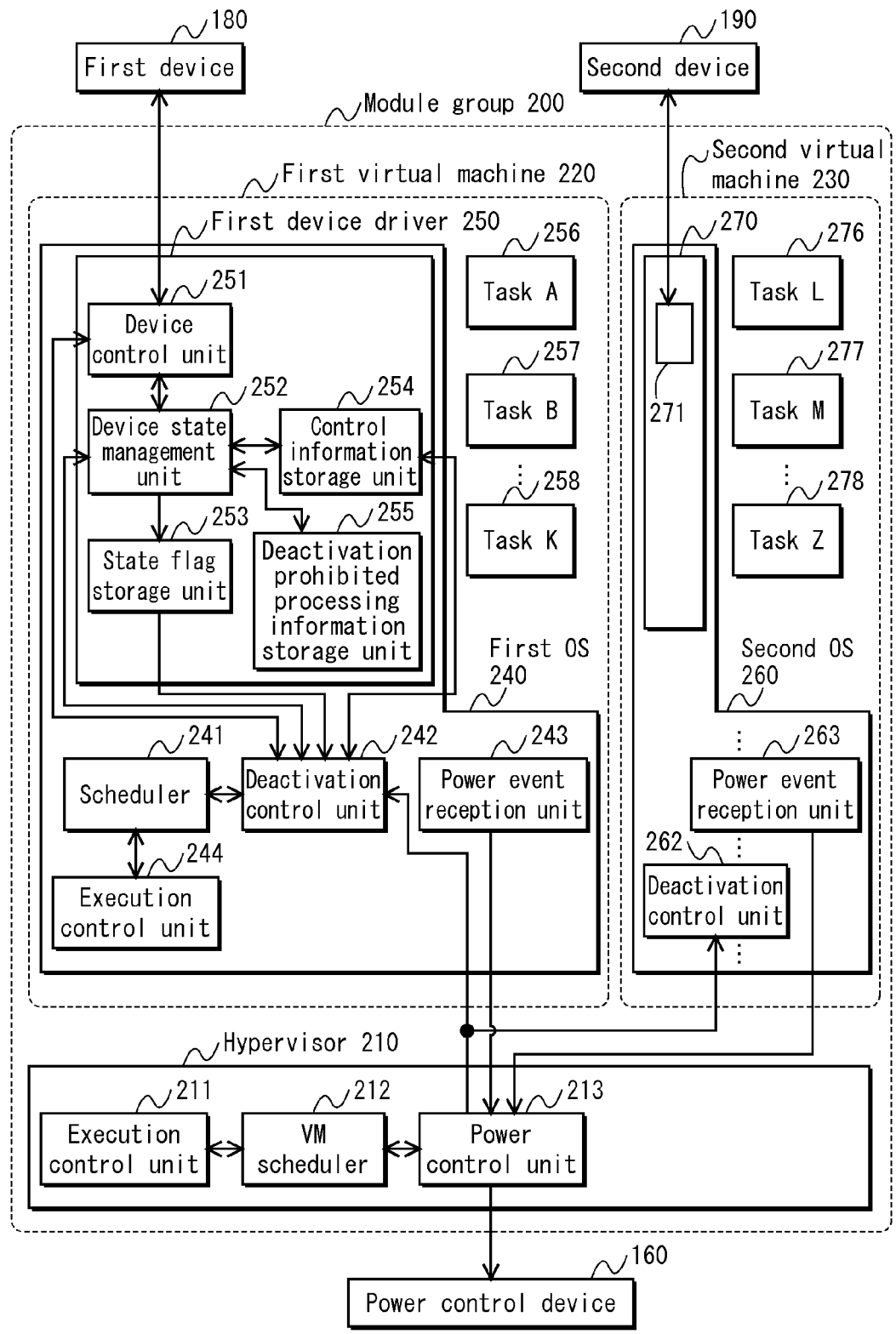
FIG. 2 is a schematic diagram showing a program module group 200.

FIG. 2 is a schematic diagram showing a program module (hereinafter, simply referred to as "module") group 200 that is executed on the processor 120.

As shown in FIG. 2, the program module executed on the processor 120 includes the hypervisor 210, a first OS 240, a second OS 260, a task A256 through a task K258, and a task L276 through a task Z278. The hypervisor 210 controls the operations of the first OS 240 and the second OS 260. The first OS 240 controls the execution of the task A256 through K258, and the second OS 260 controls the execution of the task L276 through the task Z278. Here, the first OS 240 causes a system including the first OS 240 and a module group whose operations are controlled thereby to function as a first virtual machine 220. Similarly, the second OS 260 causes a system including the second OS 260 and a module group whose operations are controlled thereby to function as a second virtual machine 230.

The hypervisor 210 includes an execution control unit 211, a VM scheduler 212 and a power control unit 213. The hypervisor 210 controls the operations of the first OS 240 and the second OS 260. That is, the hypervisor 210 controls the operations of the first virtual machine 220 and the second virtual machine 230.

The first OS 240 includes a scheduler 241, a deactivation control unit 242, a power event reception unit 243, an execution control unit 244 and a first device driver 250. The first OS 240 is connected to the first device 180 and controls the execution of the task A256 through the task K258. The first device driver 250 includes a device control unit 251, a device state management unit 252, a state flag storage unit 253, a control information storage unit 254, and a deactivation prohibited processing information storage unit 255.

The second OS 260 has the same functions as those of the first OS except that the second OS 260 is connected to the second device 190 instead of the first device 180. Accordingly, explanations thereof are omitted.

The VM scheduler 212 is connected to the execution control unit 211 and the power control unit 213, and performs scheduling of OSs (here, the first OS 240 and the second OS 260) whose operations are controlled by the hypervisor 210.

The execution control unit 211 is connected to the VM scheduler 212. Based on the scheduling performed by the VM scheduler 212, the execution control unit 211 allocates hardware resources in the virtual machine system 100 by time sharing to each OS whose operations are controlled by the hypervisor 210, and dynamically controls the execution so that each OS operates independently of each other. Here, dynamic execution control executed by the execution control unit 211 for controlling the operations of OSs include activation of a new OS (i.e., creation of a new virtual machine), deactivation of an OS (i.e., deactivation of a virtual machine), and the like.

The power control unit 213 is connected to a power event reception unit (here, the power event reception unit 243 and a power event reception unit 263) of each OS whose operations are controlled by the hypervisor 210 (here, the first OS 240 and the second OS 260), a deactivation control unit (here, the deactivation control unit 242 and a deactivation control unit 262) and the power control device 160. The power control unit 213 has the following five functions.

VM deactivation instruction function: a function of, when the power control unit 213 receives a power reducing signal from a power event reception unit (here, the power event reception unit 243 or the power event reception unit 263) of any one of the OSs (here, the first OS 240 and the second OS 260) whose operations are controlled by the hypervisor 210, transmitting VM deactivation instructing signals to deactivation control units (here, the deactivation control unit 242 and the deactivation control unit 262) of all OSs whose operations are controlled by the hypervisor 210, the power reducing signal instructing the processor 120 to reduce power consumption, and each VM deactivation instructing signal instructing the corresponding deactivation control unit to prepare deactivation of the OS (i.e., deactivates of the virtual machine).

First VM deactivation function: a function of, when the power control unit 213 receives a VM deactivation ready signal that is transmitted from a deactivation control unit of one of the OSs (here, the deactivation control unit 242 or the deactivation control unit 262) in response to the VM deactivation instructing signal, transmitting a signal indicating that the one OS is to stop operating to the VM scheduler 212, the VM deactivation ready signal indicating that the virtual machine is ready to stop operating.

Processing time reducing signal transmission function: a function of, when the power control unit 213 receives a VM deactivation prohibiting signal that is transmitted from a deactivation control unit (here, the deactivation control unit 242 or the deactivation control unit 262) of one of the OSs in response to the VM deactivation instructing signal, transmitting the processing time reducing signal to the one deactivation control unit, the VM deactivation prohibiting signal indicating that the virtual machine is not permitted to stop operating.

Second VM deactivation function: a function of transmitting, to the VM scheduler 212, a signal for instructing one of the OSs to stop operating when the power control unit 213 receives the VM deactivation prohibition canceling signal that is transmitted from a deactivation control unit (here, the deactivation control unit 242 or the deactivation control unit 262) of the one OS in response to the processing time reducing signal.

Low power transition ready signal transmission function: a function of, when the execution control unit 211 stops all OSs, saving the context of the processor 120 in a predetermined memory area in the flush memory included in the memory 130 and causing the processor 120 to output a low power transition ready signal to the power control device 160.

The device control unit 251 is connected to the first device 180, the device state management unit 252 and the deactivation control unit 242. The device control unit 251 has the following two functions.

Device control function: a function of controlling the first device 180 based on a signal from a task that involves processing using the first device 180 (here, any one of the task A256 through the task K258) among tasks whose execution is controlled by the first OS 240.

Device deactivation function: a function of executing device deactivation of placing the first device 180 in a state where the first device 180 can be turned off, when the device control unit 251 receives, from the deactivation control unit 242, the device deactivation signal for instructing the device control unit 251 to place the first device 180 in a state where the first device 180 can be turned off.

The control information storage unit 254 is connected to the device state management unit 252 and the deactivation control unit 242. The control information storage unit 254 stores therein control information 300.

FIG. 3 shows an example of the data structure of the control information 300 stored in the control information storage unit 254.

As shown in FIG. 3, the control information 300 includes a device control ID 310, a task ID 320 and a relevant task ID 330 in association with one another.

The device control ID 310 is an identifier for identifying processing that uses the first device 180 and involves a task identified by the task ID 320 associated with the device control ID 310.

The task ID 320 is an identifier for identifying a task that involves processing using the first device 180 among tasks whose execution is controlled by the first OS 240 (here, the task A256 through the task K258).

The relevant task ID 330 is an identifier for identifying, when a task identified by the task ID 320 associated with relevant task ID 330 involves processing identified by the device control ID 310 associated with the task ID 320, a task that is to be executed before the processing is completed. Here, when a task identified by the task ID 320 involves processing identified by the device control ID 310 associated with the task ID 320 and there is no task that is to be executed before the processing is completed, a value of the relevant task ID 330 associated with the task is null.

In an example shown in FIG. 3, a task having the task ID "16" (task A256) involves a processing having the device control ID "009" (sound source switching) that uses the first device 180, and before the processing is completed, a task having the relevant task ID "17" (task B257) is to be executed.

The deactivation prohibited processing information storage unit 255 is connected to the device state management unit 252. The deactivation prohibited processing information storage unit 255 stores therein deactivation prohibited processing information 400.

FIG. 4 shows an example of the data structure of the deactivation prohibited processing information 400 stored in the deactivation prohibited processing information storage unit 255.

As shown in FIG. 4, the deactivation prohibited processing information 400 includes one or more deactivation prohibited processing IDs 410.

Each deactivation prohibited processing ID 410 is an identifier for identifying predetermined deactivation prohibited processing among processing using the first device 180. Until the deactivation prohibited processing is completed, a virtual machine is not permitted to stop operating.

Here, examples of the deactivation prohibited processing include: processing that may cause physical damages to a device that is being used when the processing is stopped before its completion; processing that may cause inconsistency when the processing is stopped before its completion and started next time; and processing that may cause annoyance or discomfort to a user using the virtual machine system 100 when the processing is stopped before its completion. For example, the sound source switching having the deactivation prohibited processing ID 410 "009" in FIG. 4 is defined as the deactivation prohibited processing. This is because the first device 180 that is a sound outputting device might cause noise unpleasant to a user when the processing is stopped before its completion.

The state flag storage unit 253 is connected to the device state management unit 252 and the deactivation control unit 242. The state flag storage unit 253 stores therein a state flag. Here, the state flag is a one-bit flag having a logical value "1" when the deactivation prohibited processing is being executed, and has a logical value "0" when the deactivation prohibited processing is not being executed. That is, the state flag has the logical value "1" when the virtual machine is executing processing during which the virtual machine is not permitted to stop operating, and has the logical value "0" when the virtual machine is not executing processing during which the virtual machine is not permitted to stop operating.

The device state management unit 252 is connected to the device control unit 251, the state flag storage unit 253, the control information storage unit 254 and the deactivation prohibited processing information storage unit 255. The device state management unit 252 has the following four functions.

Device involvement processing management function: a function of, when the first OS 240 is executing any one of the tasks (here, the task A256 through the task K258) that involves processing using the first device 180, receiving the following three identifiers: an identifier that is transmitted from the one task for identifying the processing; an identifier for identifying the one task; and an identifier for identifying a task that is to be executed in connection with the processing before the processing is completed.

Control information write function: a function of setting an identifier of the deactivation prohibited processing to the device control ID 310 and setting an identifier of the task to the task ID 320 when device state management unit 252 starts a task involving the first device 180 to perform the deactivation prohibited processing identified by the deactivation prohibited processing ID 410 included in the deactivation prohibited processing information 400 stored in the deactivation prohibited processing information storage unit 255, creating control information 300 by associating an identifier of a task that is to be executed in connection with the processing before the processing is completed as the relevant task ID 330, and storing the control information 300 in the control information storage unit 254.

Control information removal function: a function of removing the control information 300 stored in the control information storage unit 254 when deactivation prohibited processing identified by the device control ID stored in the control information 300 is completed while the control information storage unit 254 stores therein the control information 300.

State flag update function: a function of (i) updating the state flag stored in the state flag storage unit 253 to have a logical value "1" when device state management unit 252 starts a task involving the first device 180 for performing deactivation prohibited processing identified by the deactivation prohibited processing ID 410 included in the deactivation prohibited processing information 400 stored in the deactivation prohibited processing information storage unit 255, and of (ii) updating the state flag stored in the state flag storage unit 253 to have a logical value "0" when device state management unit 252 completes the task involving the first device 180 for performing deactivation prohibited processing identified by the deactivation prohibited processing ID 410 included in the deactivation prohibited processing information 400 stored in the deactivation prohibited processing information storage unit 255.

The scheduler 241 is connected to the execution control unit 244 and the deactivation control unit 242. The scheduler 241 manages an execution priority for each task whose execution is controlled by the first OS 240 (here, the task A256 through the task K258) and performs scheduling of the tasks in accordance with the managed execution priorities.

The execution control unit 244 is connected to the scheduler 241, and controls the execution of each task by time sharing based on the scheduling provided by the scheduler 241.

The power event reception unit 243 is connected to the power control unit 213. The power event reception unit 243 transmits a power reducing signal to the power control unit 213 (i) when a user using the first virtual machine 220 inputs, via the input device 151, a command for instructing reduction of power consumption of the processor 120, and (ii) when the first virtual machine 220 remains in an idle state for a predetermined time period (for example, for 10 seconds).

The deactivation control unit 242 is connected to the scheduler 241, the device control unit 251, the device state management unit 252, the state flag storage unit 253, the control information storage unit 254 and the power control unit 213. The deactivation control unit 242 has the following three functions.

Response function: a function of checking the state flag stored in the state flag storage unit 253 when the VM deactivation instructing signal is transmitted from the power control unit 213, and (i) when the state flag has the logical value "1" (i.e., when the flag indicates that the virtual machine is executing deactivation prohibited processing), transmitting a VM deactivation prohibiting signal to the power control unit 213, and (ii) when the state flag has the logical value "0" (i.e., when the flag indicates that the virtual machine is not executing deactivation prohibited processing), transmitting a device deactivation signal to the device control unit 251, and then outputting the VM deactivation ready signal to the power control unit 213 when the device deactivation executed by the device control unit 251 in response to the transmitted device deactivation signal is completed.

Priority change function: a function of referring to the control information 300 (see FIG. 3) stored in the control information storage unit 254 when the deactivation control unit 242 receives the processing time reducing signal from the power control unit 213, and transmitting a priority changing signal to the scheduler 241. The priority changing signal instructs the scheduler 241, which manages the execution priorities, to give the highest execution priorities to a task identified by the task ID 320 (hereinafter, referred to "device involving task") and a task identified by the relevant task ID 330 (hereinafter, referred to "relevant task").

VM deactivation prohibition cancel function: a function of transmitting a device deactivation signal to the device control unit 251 when the deactivation control unit 242 transmits the priority changing signal to the scheduler 241 and the deactivation prohibited processing that is being executed is completed, and outputting the VM deactivation prohibition canceling signal to the power control unit 213 when the device control unit 251 completes the device deactivation executed in response to the transmitted device deactivation signal.

The task A256 through the task K258 are tasks whose execution is controlled by the first OS 240.

These tasks are realized by causing the device control unit 251 to control the first device 180 when the processing involving the first device 180 is executed. Further, when starting the processing involving the first device 180, these tasks transmit, to the device state management unit 252, identifiers for identifying the processing, identifiers for identifying the tasks, and identifiers for identifying a task that is to be executed in connection with the processing before the processing is completed.

The following describes an operation executed by the virtual machine system 100 described above with reference to the drawings.

<Operations>

The virtual machine system 100 starts the VM deactivation requesting when one virtual machine transmits a power reducing signal to the hypervisor 210, and the hypervisor 210 transmits a VM deactivation signal to each virtual machine.

Each virtual machine starts the response processing when receiving the VM deactivation signal, refers to the state flag stored in the state flag storage unit 253, and (i) when the virtual machine is not executing the deactivation prohibited processing, transmits the VM deactivation ready signal, and (ii) when the virtual machine is executing the deactivation prohibited processing, transmits the VM deactivation prohibiting signal.

In the VM deactivation requesting, the hypervisor 210 deactivates a virtual machine transmitting the VM ready signal, and does not deactivate a virtual machine transmitting the VM deactivation prohibiting signal and transmits the processing time reducing signal to the virtual machine.

Upon receiving the processing time reducing signal, the virtual machine starts the processing time reduction, completes the deactivation prohibited processing that is being executed in a rather short time, and transmits the VM deactivation prohibition canceling signal to the hypervisor 210.

Following the VM deactivation requesting, the virtual machine system 100 executes the power state switching. In this processing, the hypervisor 210 deactivates the virtual machine transmitting the VM deactivation prohibition canceling signal. When deactivating all of the virtual machines, the hypervisor 210 causes the processor 120 to output the low power transition ready signal to the power control device 160.

Upon receiving the low power transition ready signal, the power control device 160 starts the device deactivation, and stops power supplied to the integrated circuit 110, the first device 180, and the second device 190.

The following describes in detail the above-described VM deactivation requesting, response processing, processing time reduction, power state switching and device deactivation with reference to flowcharts.

<VM Deactivation Requesting>

The VM deactivation requesting is mainly executed by the hypervisor 210 and OSs (here, first OS 240 and the second OS 260) whose operations are controlled by the hypervisor 210. In the VM deactivation requesting, the hypervisor 210 transmits the VM deactivation signal to each OS, and (i) stops an OS transmitting the VM deactivation ready signal in response to the VM deactivation instructing signal (i.e., deactivates a virtual machine corresponding to the OS), and (ii) does not stop an OS transmitting the VM deactivation prohibiting signal in response to the VM deactivation instructing signal (i.e., does not deactivate a virtual machine corresponding to the OS) and transmits the processing time reducing signal to the OS.

Figure 5:
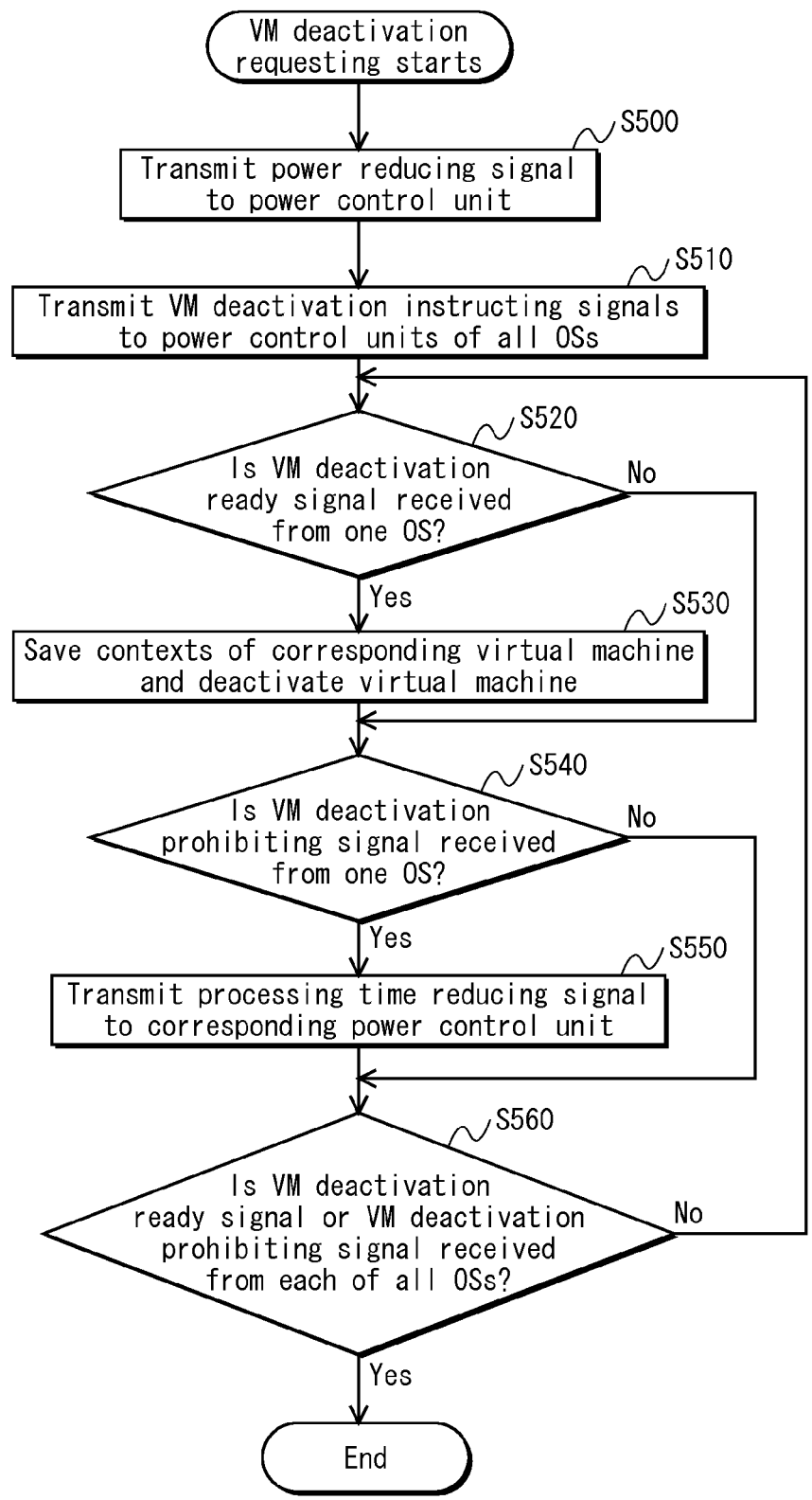
FIG. 5 is a flowchart of VM deactivation requesting.

FIG. 5 is a flowchart of VM deactivation requesting.

The VM deactivation requesting starts (i) when the power event reception unit included in an OS whose operations are controlled by the hypervisor 210 (here, the power event reception unit 243 or the power event reception unit 263) receives, through the input device 151, a command for instructing reduction of power consumption from a user using a virtual machine including the corresponding power event reception unit, or (ii) when a virtual machine including the corresponding power event reception unit remains in an idle state for a predetermined time period (for example, one hour).

Upon commencement of the VM deactivation, the power event reception unit (here, the power event reception unit 243 or the power event reception unit 263) transmits a power reducing signal to the power control unit 213 (step S500).

Upon receiving the transmitted power reducing signal, the power control unit 213 transmits the VM deactivation instructing signal to the deactivation control unit of all OSs (here, the deactivation control unit 242 and the deactivation control unit 262) (step S510).

Upon transmitting the VM deactivation instructing signal, the power control unit 213 determines whether the VM deactivation ready signal is received in response to the VM deactivation instructing signal from the deactivation control unit of one of the OSs (here, the deactivation control unit 242 or the deactivation control unit 262) (step S520).

In the processing of step S520, when the VM deactivation ready signal is received in response to the VM deactivation instructing signal (step S520: Yes), the power control unit 213 transmits, to the VM scheduler 212, a signal indicating that the OS transmitting the VM deactivation ready signal is to stop operating. The VM scheduler 212 then performs scheduling so as to stop the OS. Based on the scheduling performed by the scheduler 241, the execution control unit 211 saves the context of the virtual machine realized by the OS in a predetermined memory area of the flush memory included in the memory 130, and stops the OS (i.e., deactivates the virtual machine realized by the OS) (step S530).

After completing the processing of step S530, or when the VM deactivation ready signal is not received in response to the VM deactivation instructing signal in the processing of step S520 (step S520: No), the power control unit 213 determines whether a VM deactivation prohibiting signal is received in response to the VM deactivation instructing signal from the deactivation control unit of one of the OSs (here, the deactivation control unit 242 or the deactivation control unit 262) (step S540).

In the processing of step 540, when the power control unit 213 receives the VM deactivation prohibiting signal in response to the VM deactivation instructing signal (step S540: Yes), the power control unit 213 transmits the processing time reducing signal to the deactivation control unit transmitting the VM deactivation prohibiting signal (step S550).

After completing the processing of step S550, or when not receiving the VM deactivation prohibiting signal in response to the VM deactivation instructing signal in the processing of step S540 (step S540: No), the power control unit 213 determines whether the VM deactivation ready signal or the VM deactivation prohibiting signal is received from every OS (step S560).

When not receiving the VM deactivation ready signal or the VM deactivation prohibiting signal from every OS in the processing of step S560 (step S560: No), the virtual machine system 100 returns to the processing of step S520 and repeats the processing following step S520.

Upon receiving either the VM deactivation ready signal or the VM deactivation prohibiting signal from every OS in the processing of step S560 (step S560: Yes), the virtual machine system 100 ends the VM deactivation requesting.

<Response Processing>

The response processing is mainly executed by OSs whose operations are controlled by the hypervisor 210 (here, the first OS 240 and the second OS 260). In the response processing, when a VM deactivation signal is received from the power control unit 213, the OSs refer to the state flags stored in the state flag storage unit 253, and transmit either the VM deactivation ready signal or the VM deactivation prohibiting signal to the power control unit 213.

Here, it is assumed that an OS controlled by the hypervisor 210 is the first OS 240. However, the second OS 260 may be used instead of the first OS 240.

Figure 6:
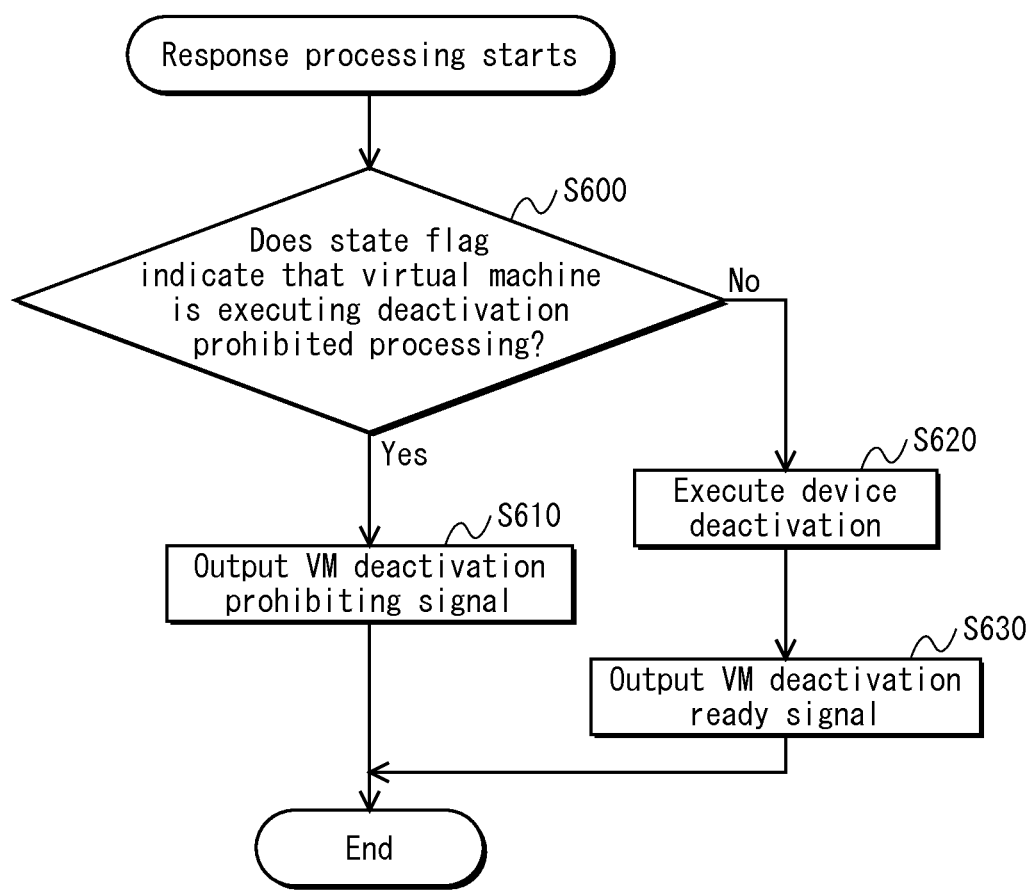
FIG. 6 is a flowchart of response processing.

FIG. 6 is a flowchart of the response processing.

The response processing starts when the deactivation control unit 242 receives the VM deactivation signal transmitted by the power control unit 213.

Upon commencement of the response processing, the deactivation control unit 242 determines whether the state flag stored in the state flag storage unit 253 has the logical value "1" (i.e., whether the deactivation prohibited processing is being executed) (step S600).

When the state flag stored in the state flag storage unit 253 indicates that the deactivation prohibited processing is being executed in the processing of step S600 (step S600: Yes), the deactivation control unit 242 outputs the VM deactivation prohibiting signal to the power control unit 213 (step S610).

When the state flag stored in the state flag storage unit 253 does not indicate that the deactivation prohibited processing is being executed in the processing of step S600 (step S600: No), the deactivation control unit 242 transmits the device deactivation signal to the device control unit 251. The device control unit 251 executes the device deactivation (step S620), and places the first device 180 in a state where the first device 180 can be turned off. The deactivation control unit 242 outputs the VM deactivation ready signal to the power control unit 213 (step S630).

After completing the processing of step S610, or after completing the processing of step S630, the virtual machine system 100 ends the response processing.

<Processing Time Reduction>

The processing time reduction is mainly executed by OSs whose operations are controlled by the hypervisor 210 (here, the first OS 240 and the second OS 260). In the processing time reduction, the OSs refer to the control information 300 (see FIG. 3) stored in the control information storage unit 254 when receiving the processing time reducing signal from the power control unit 213, and controls the execution of the device involving task identified by the task ID 320 and the relevant task identified by the relevant task ID 330 after giving the highest execution priorities to these tasks.

Here, it is assumed that an OS controlled by the hypervisor 210 is the first OS 240. However, the second OS 260 may be used instead of the first OS 240.

Figure 7:
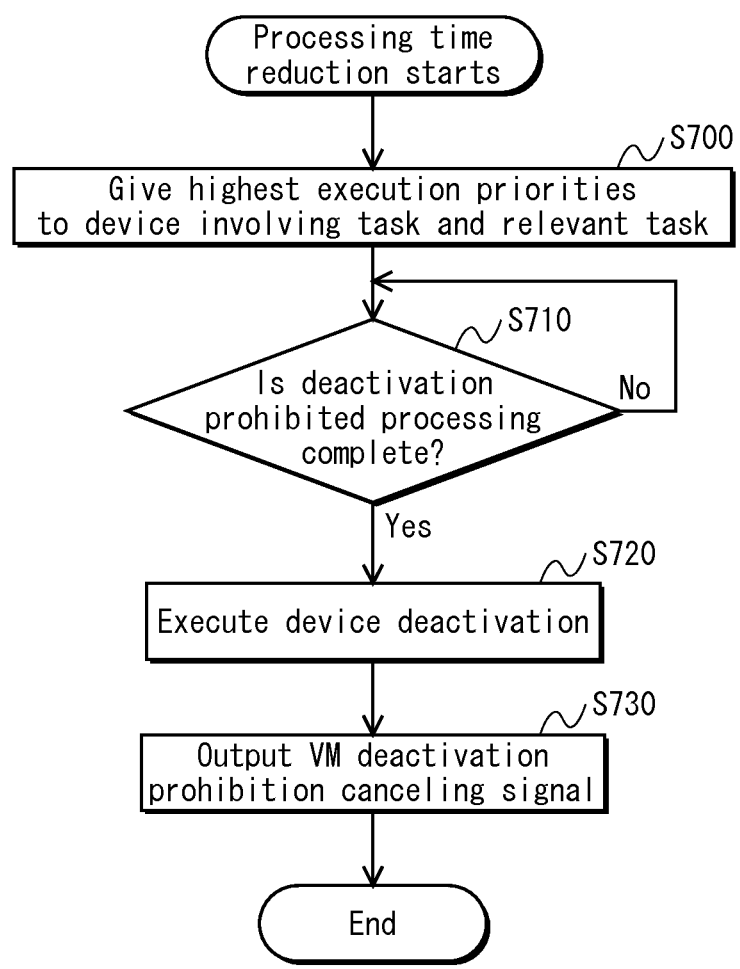
FIG. 7 is a flowchart of processing time reduction.

FIG. 7 is a flowchart of processing time reduction.

The processing time reduction starts when the deactivation control unit 242 receives the processing time reducing signal transmitted by the power control unit 213.

Upon commencement of the processing time reduction, the deactivation control unit 242 refers to the control information 300 stored in the control information storage unit 254 (see FIG. 3), and transmits the priority changing signal to the scheduler 241. The priority changing signal instructs the scheduler 241, which manages the execution priorities, to give the highest execution priorities to the device involving task identified by the task ID 320 and the relevant task identified by the relevant task ID 330. The scheduler 241 changes, to the highest, the execution priorities managed thereby of the device involving task and the relevant task, and performs scheduling of tasks whose execution is controlled by the first OS 240 (step S700). Based on the scheduling performed by the scheduler 241, the execution control unit 244 controls the execution of the device involving task and the relevant task at the highest execution priority.

Upon completion of the deactivation prohibited processing (when the result of step S710 is Yes after a repeated result of No), the device control unit 251 executes the device deactivation (step S720), and places the first device 180 in a state where the first device 180 can be turned off. The deactivation control unit 242 outputs the VM deactivation prohibition canceling signal to the power control unit 213 (step S730).

Upon completion of the processing of step S730, the virtual machine system 100 ends the processing time reduction.

<Power State Switching>

The power state switching is mainly executed by the hypervisor 210, following the VM deactivation requesting. In the power state switching, preparations for stopping the processor 120 are made.

Figure 8:
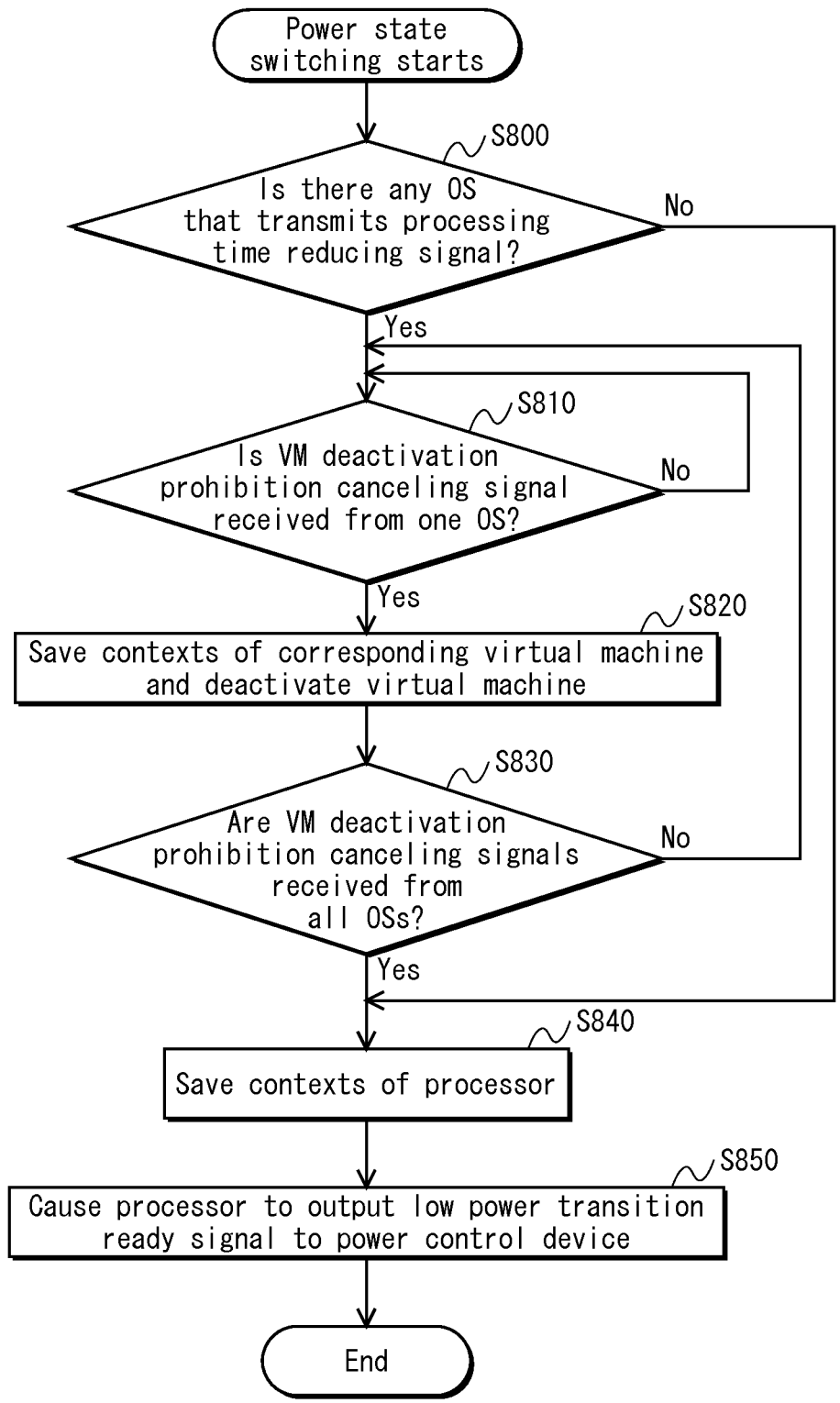
FIG. 8 is a flowchart of power state switching.

FIG. 8 is a flowchart of the power state switching.

The power state switching starts when the preceding VM deactivation requesting ends.

Upon commencement of the power state switching, the power control unit 213 determines whether there is any OS transmitting the processing time reducing signal in the preceding VM deactivation requesting (step S800).

When there is an OS transmitting the processing time reducing signal in the processing of step S800 (step S800: Yes) and the power control unit 213 receives the VM deactivation prohibition canceling signal transmitted from one OS transmitting the processing time reducing signals (when the result of step S810 is Yes after a repeated result of No), the power control unit 213 outputs, to the VM scheduler 212, a signal indicating that the one OS transmitting the VM deactivation prohibition canceling signal is to stop operating. The VM scheduler 212 performs scheduling so as to stop the OS. Based on the scheduling performed by the scheduler 241, the execution control unit 211 saves the context of the virtual machine realized by the OS in a predetermined memory area in the flush memory included in the memory 130, and stops the OS (i.e., deactivates the virtual machine realized by the OS) (step S820).

On completion of the processing of step S820, the power control unit 213 determines whether the VM deactivation prohibition canceling signal is received from every OS transmitting the processing time reducing signal (step S830).

When the VM deactivation prohibition canceling signal is not received from every OS transmitting the processing time reducing signal in the processing of step S830 (step S830: No), the power control unit 213 returns to the processing of step S810 and repeats processing from step S810 onwards.

When the VM deactivation prohibition canceling signal is received from every OS transmitting the processing time reducing signal in step S830 (step S830: Yes) and when there is no OS transmitting the processing time reducing signal in step S800 (step S800: No), the power control unit 213 saves the context of the processor 120 in a predetermined memory area of the flush memory included in the memory 130 (step S840) and causes the processor 120 to output a low power transition ready signal to the power control device 160 (step S850).

Upon completion of the processing of step S850, the virtual machine system 100 ends the power state switching.

Device Deactivation>

The device deactivation is mainly executed by the power control device 160 and the clock generator 170. The device deactivation is processing of stopping power supplied to the processor 120, the first device 180 and the second device 190, and of stopping clock signal supplied to the processor 120.

Figure 9:
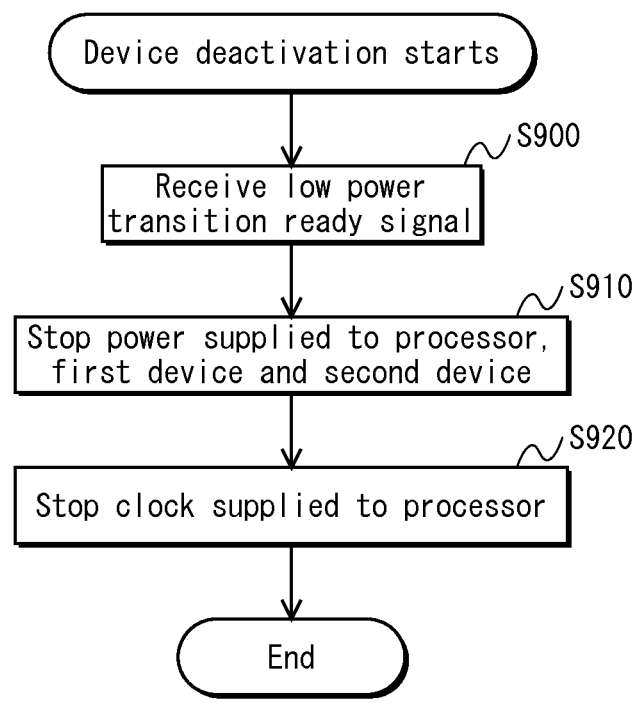
FIG. 9 is a flowchart of device deactivation.

FIG. 9 is a flowchart of device deactivation.

The device deactivation starts when the processor 120 transmits a low power transition ready signal to the power control device 160 whose operation state is in the first state.

When the device deactivation starts, the power control device 160 whose operation state is in the first state receives the low power transition ready signal transmitted from the processor 120 (step S900). The power control device 160 then switches the operation state thereof from the first state to the second state. The power control device 160 stops power supplied to the circuits constituting the integrated circuit 110 (processor 120, the memory 130, etc.), the first device 180 and the second device 190 (step S910).

When the operation state of the power control device 160 is switched to the second state, the clock generator stops the clock signal supplied to the integrated circuit 110 (step S920).

On completion of the processing of step S920, the virtual machine system 100 ends the device deactivation.

<Consideration>

Even when the virtual machine system 100 with the above structure attempts to deactivate virtual machines while one of the virtual machines is executing one task to perform processing using a device, the virtual machine system 100 deactivates the virtual machine if the processing is not deactivation prohibited processing.

Further, when the virtual machine system 100 attempts to deactivate virtual machines while one of the virtual machines is executing one task to perform deactivation prohibited processing involving a device, the virtual machine executes the one task and a task that is to be executed in connection with the one task at the highest execution priority. This allows the virtual machine system 100 to deactivate the virtual machine in a rather short time.

<Embodiment 2>

<Outline>

A virtual machine system 1000 that is a partially modified version of the virtual machine system 100 pertaining to Embodiment 1 is described below, as an embodiment of a virtual machine system pertaining to the present invention.

The virtual machine system 1000 is connected to an external server via a network. When a virtual machine whose operations are controlled by the virtual machine system 1000 receives the processing time reducing signal from a hypervisor while the virtual machine is executing a response waiting that is processing of waiting a response signal from the external server, which is deactivation prohibited processing, the virtual machine executes network disconnection that is processing of breaking the connection between the virtual machine system and the network at the highest execution priority so as to safely deactivate the virtual machine without waiting for the completion of the response waiting. Upon completion of the network disconnection, the virtual machine transmits a VM deactivation canceling signal to the hypervisor.

The following describes the structure of the virtual machine system 1000 pertaining to Embodiment 2 with reference to the drawings, focusing on the differences from the virtual machine system 100 pertaining to Embodiment 1.

<Structure>

Figure 10:
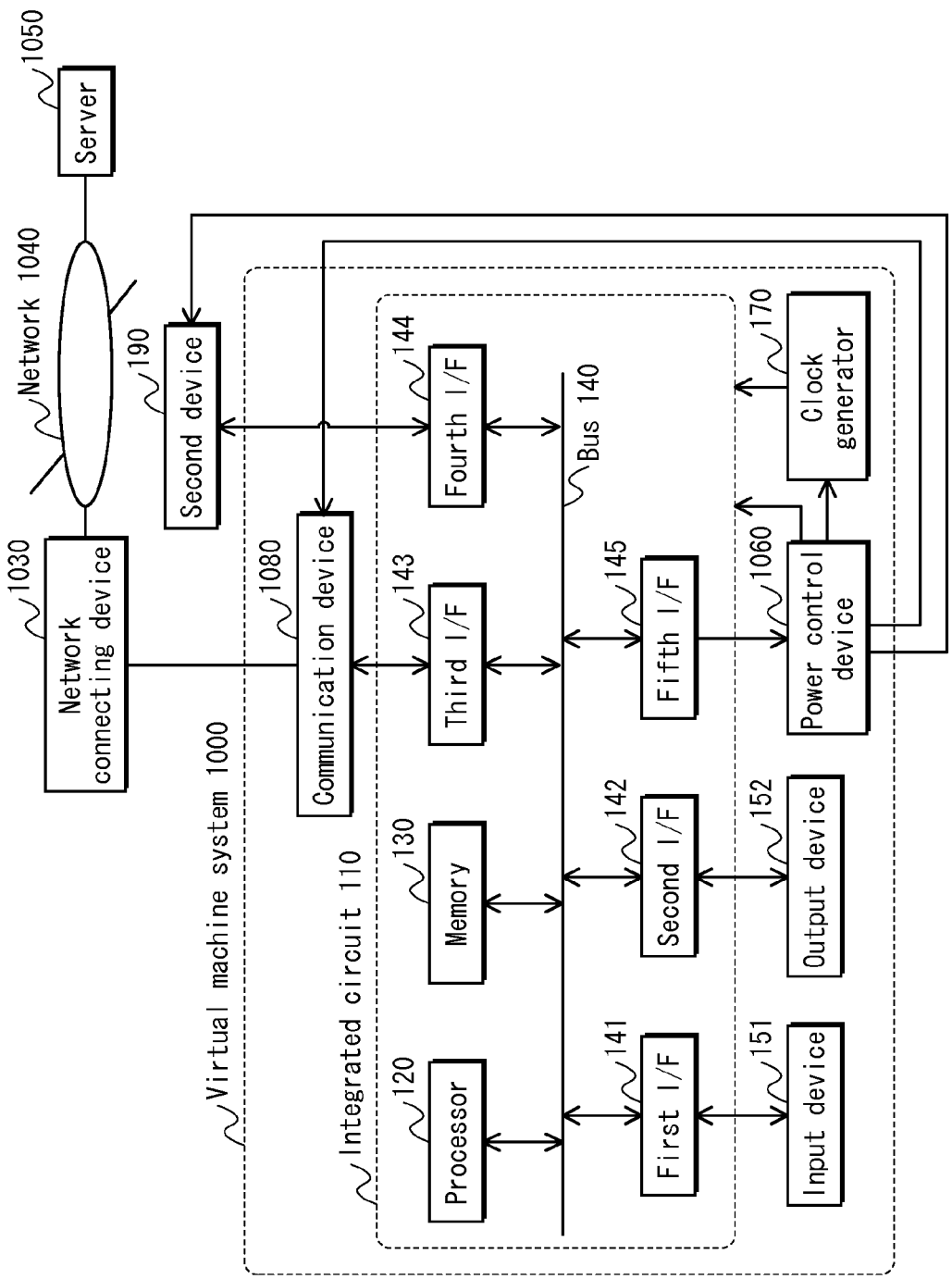
FIG. 10 is a block diagram showing the principal hardware structure of a virtual machine system 1000.

FIG. 10 is a block diagram showing the principal hardware structure of the virtual machine system 1000.

As shown in FIG. 10, the virtual machine system 1000 differs from the virtual machine system 100 pertaining to Embodiment 1 in that the power control device 160 is modified to a power control device 1060 and a communication device 1080 is added. The hardware of the integrated circuit 110 is not modified from the integrated circuit 110 of the virtual machine system 100 pertaining to Embodiment 1, but part of the software stored in the memory 130 is modified.

The virtual machine system 100 pertaining to Embodiment 1 is an example of a system connected to the first device 180 and the second device 190. In contrast, the virtual machine system 1000 pertaining to Embodiment 2 is an example of a system connected to a server 1050, instead of the first device 180, via a network connecting device 1030 and a network 1040.

The power control device 1060 is a modification of the power control device 160 pertaining to Embodiment 1. The power control device 1060 supplies power to the communication device 1080 pertaining to Embodiment 2, instead of to the first device 180 pertaining to Embodiment 1. The power control device 1060 is connected to the fifth I/F 145, the clock generator 170, the communication device 1080, the second device 190 and the integrated circuit 110.

The communication device 1080 is connected to the third I/F 143, the power control device 160 and the network connecting device, and controlled by the processor 120 that executes programs. The communication device 1080 operates with power supplied from the power control device 160. The communication device 1080 communicates with the network connecting device 1030, and communicates with the server 1050 via the network connecting device 1030 and the network 1040.

The network connecting device 1030 is connected to the communication device 1080 and the network 1040. Based on signals transmitted from the communication device 1080, the network connecting device 1030 switches between a connected state and a disconnected state. In the connected state, the communication device 1080 and the network 1040 are connected to each other. In the disconnected state, the communication device 1080 and the network 1040 are disconnected to each other.

The network 1040 is connected to the network connecting device 1030 and the server 1050, transporting signals between the devices connected thereto.

The server 1050 is connected to the network 1040. The server 1050 communicates with the virtual machine system 1000 via the network connecting device 1030 and the network 1040. The server 1050 executes processing requested from the virtual machine system 1000, and transmits a response signal indicating the completion of the requested processing to the virtual machine system 1000 on completion of the requested processing. The server 1050 determines whether the network 1040 and the communication device 1080 are connected via the network connecting device 1030.

When the server 1050 transmits a response signal to the virtual machine system 1000 under condition that the server 1050 has determined that the network 1040 and the communication device 1080 are in the connected state, if the server 1050 does not receive a reply signal within a predetermined time period after transmitting the response signal (e.g., one second), the server 1050 repeats transmitting the response signal until receiving the reply signal within the predetermined time period. The reply signal indicates that the response signal has been received.

The following describes the functional structure of the virtual machine system 1000 with the above hardware structure with reference to the drawings.

Figure 11:
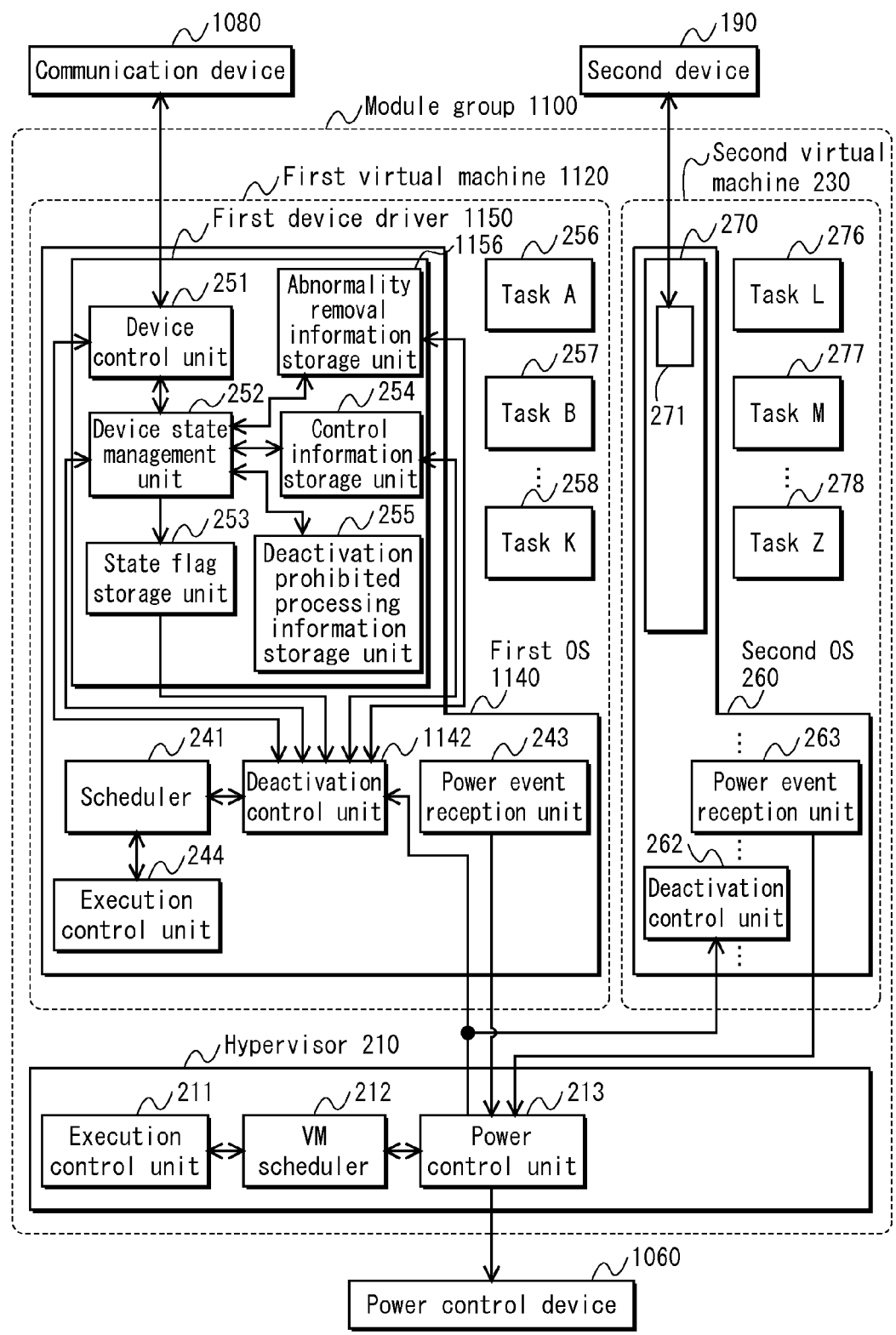
FIG. 11 is a schematic diagram showing a program module group 1100.

FIG. 11 is a schematic diagram showing a module group 1100 that is executed on the processor 120.

As shown in FIG. 11, the module group 1100 is a modification of the module group 200 pertaining to Embodiment 1. The deactivation control unit 242 is modified to be a deactivation control unit 1142, and an abnormality removal information storage unit 1156 is added. Due to these changes and addition, the first device driver 250 is modified to be a first device driver 1150, the first OS 240 is modified to be a first OS 1140, and the first virtual machine 220 is modified to be a first virtual machine 1120.

The abnormality removal information storage unit 1156 is connected to the device state management unit 252, and stores therein abnormality removal information 1200.

FIG. 12 shows an example of the data structure of the abnormality removal information 1200 stored in the abnormality removal information storage unit 1156.

As shown in FIG. 12, the abnormality removal information 1200 includes a deactivation prohibited processing ID 1210 and an abnormality removal ID 1220 in association with each other.

The deactivation prohibited processing ID 1210 identifies deactivation prohibited processing that is associated in advance with abnormality removal (described later) among deactivation prohibited processing identified by the deactivation prohibited processing IDs 410 included in the deactivation prohibited processing information 400 (see FIG. 4) stored by the deactivation prohibited processing information storage unit 255. In this example, the deactivation prohibited processing identified by the deactivation prohibited processing ID 1210 is a response waiting. Here, the response waiting is processing executed by the virtual machine system 1000 after the virtual machine system 1000 requests the server 1050 to execute certain processing. To be more specific, the response waiting is processing of waiting for a response signal transmitted from the server 1050 and of transmitting a reply signal to the server 1050 upon receiving the response signal. The response signal indicates that the requested certain processing is completed. When the server 1050 has determined that the network 1040 and the communication device 1080 are in the connected state after transmitting a response signal, the server 1050 repeats retransmitting the response signal until receiving a reply signal in response to the response signal. Accordingly, when the server 1050 has determined that the network 1040 and the communication device 1080 are in the connected state and the virtual machine 1120 stops operating before the virtual machine system 1000 completes the response waiting, the server 1050 does not receive the reply signal anymore and the server 1050 repeats retransmitting the response signal. This might cause inconveniences of (1) placing an unnecessary load on the server 1050 and the network 1040, and (2) unnecessarily waking up the virtual machine system 1000 by the communication from the server 1050.

The abnormality removal ID 1220 is an identifier for identifying predetermined processing that is associated with the corresponding deactivation prohibited processing ID 1210. The predetermined processing causes the virtual machine (here, the first virtual machine 1120) to safely stop operating without waiting for the deactivation prohibited processing to complete. In this example, abnormality removal identified by the abnormality removal ID 1220 is network disconnection. Here, the network disconnection is processing of controlling the network connecting device 1030 and switching the communication device 1080 and the network 1040 from the connected state to the disconnected state. When the virtual machine system 1000 executes the network disconnection to disconnect the communication device 1080 and the network 1040 before the virtual machine system 1000 completes the response waiting, the server 1050 determines that the communication device 1080 and the network 1040 are not in the connected state. Therefore, upon completing the certain processing requested by the virtual machine system 1000, the server 1050 does not repeat transmitting a response signal.

The deactivation control unit 1142 has the functions that are partially modified from the deactivation control unit 242 pertaining to Embodiment 1. The deactivation control unit 1142 is connected to the scheduler 241, the device control unit 251, the device state management unit 252, the state flag storage unit 253, the control information storage unit 254, the abnormality removal information storage unit 1156 and the power control unit 213. The deactivation control unit 1142 has the following two functions in addition to the response function of the deactivation control unit 242 pertaining to Embodiment 1.

First modified priority change function: a function of referring to the control information 300 (see FIG. 3) stored in the control information storage unit 254 and the abnormality removal information 1200 (see FIG. 12) stored in the abnormality removal information storage unit 1156 when deactivation control unit 1142 receives the processing time reducing signal from the power control unit 213, and (1) when the task ID 320 matches the deactivation prohibited processing ID 1210 (i.e., device control identified by the task ID 320 is response waiting), transmitting an abnormality removing signal to the scheduler 241. The abnormality removing signal indicates that abnormality removal identified by the abnormality removal ID 1220 (i.e., network disconnection) is to be executed at the highest execution priority, and (2) when the task ID 320 does not match the deactivation prohibited processing ID 1210 (i.e., device control identified by the task ID 320 is not response waiting), transmitting the priority changing signal to the scheduler 241. The priority changing signal instructs the scheduler 241, which manages the execution priorities, to give the highest execution priorities to a device involving task identified by the task ID 320 and a relevant task identified by the relevant task ID 330.

Modified VM deactivation prohibition cancel function: a function of transmitting a device deactivation signal to the device control unit 251 (1) when the deactivation control unit 1142 transmits the abnormality removing signal to the scheduler 241 and the abnormality removal is completed, or (2) when the deactivation control unit 1142 transmits the priority changing signal to the scheduler 241 and the deactivation prohibited processing that is being executed is completed, and then outputting the VM deactivation prohibition canceling signal to the power control unit 213 when the device control unit 251 completes the device deactivation executed in response to the device deactivation signal.

The following describes an operation executed by the virtual machine system 1000 described above with reference to the drawings.

<Operations>

The virtual machine system 1000 characteristically executes the first modified processing time reduction and the first modified device deactivation in addition to the VM deactivation requesting, the response processing, and the power state changing processing pertaining to Embodiment 1. The following describes the first modified processing time reduction and the first modified device deactivation.

<First Modified Processing Time Reduction>

The first modified processing time reduction is partially modified from the processing time reduction pertaining to Embodiment 1. The first modified processing time reduction is mainly executed by the first OS 1140. In the first modified processing time reduction, the first OS 1140 refers to the control information 300 (see FIG. 3) stored in the control information storage unit 254 and the abnormality removal information 1200 (see FIG. 12) stored in the abnormality removal information storage unit 1156 when receiving the processing time reducing signal from the power control unit 213, (1) when the deactivation prohibited processing that is being executed is processing identified by the deactivation prohibited processing ID 1210, controls the execution of abnormality removal associated with the deactivation prohibited processing at the highest execution priority, and (2) when the deactivation prohibited processing that is being executed is not processing identified by the deactivation prohibited processing ID 1210, controls the execution of the device involving task identified by the task ID 320 and the relevant task identified by the relevant task ID 330 after giving the highest execution priorities to these tasks.

Figure 13:
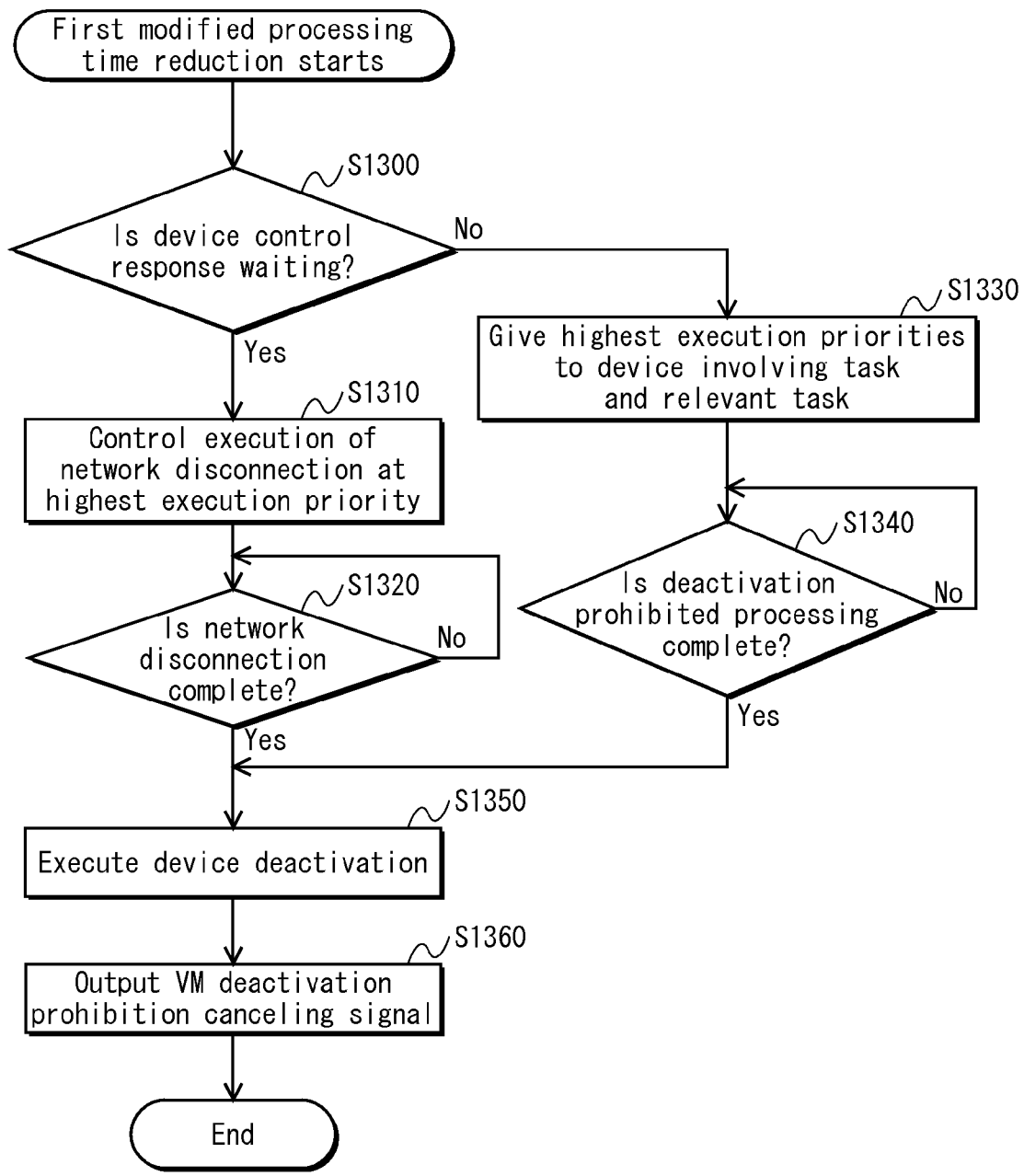
FIG. 13 is a flowchart of first modified processing time reduction.

FIG. 13 is a flowchart of the first modified processing time reduction.

Step S1330 through step S1360 are respectively the same as step S700 through step S730 in the processing time reduction (see FIG. 7) pertaining to Embodiment 1. Therefore descriptions of these processing are omitted here. The following description focuses on processing other than these processing.

The first modified processing time reduction starts when the deactivation control unit 1142 receives the processing time reducing signal transmitted by the power control unit 213.

Upon commencement of first modified processing time reduction, the deactivation control unit 1142 refers to the control information 300 (see FIG. 3) stored in the control information storage unit 254 and abnormality removal information 1200 (see FIG. 12) stored in the abnormality removal information storage unit 1156, and determines whether the task ID 320 matches the deactivation prohibited processing ID 1210 (i.e., whether device control identified by the task ID 320 is the response waiting) (step S1300).

When the device control is the response waiting in step S1300 (step S1300: Yes), the deactivation control unit 1142 transmits the abnormality removing signal to the scheduler 241. The abnormality removing signal indicates that the abnormality removal identified by the abnormality removal ID 1220 (i.e., the network disconnection) is to be executed at the highest execution priority. The scheduler 241 performs scheduling of tasks whose execution is controlled by the first OS 240 so as to give the highest execution priority to the network disconnection. The execution control unit 244 controls the execution of the network disconnection at the highest execution priority based on the scheduling provided by the scheduler 241 (step S1310).

When the device control is not the response waiting in step S1300 (step S1300: No), the virtual machine system 1000 executes processing from step S1330 to step S1340.

Upon completion of step S1310, when the network disconnection is completed (when the result of step S1320 is Yes after a repeated result of No), and when the deactivation prohibited processing is completed in step S1340 (step S1340: Yes), the virtual machine system 1000 executes processing from step S1350 to step S1360.

Upon completion of the processing of step S1360, the virtual machine system 1000 ends the first modified processing time reduction.

<First Modified Device Deactivation>

The first modified device deactivation is partially modified from the device deactivation pertaining to Embodiment 1. The first modified device deactivation is mainly executed by the power control device 1060 and the clock generator 170. The first modified device deactivation is processing of stopping power supplied to the processor 120, the first device 1080 and the second device 190, and of stopping clock signal supplied to the processor 120.

Figure 14:
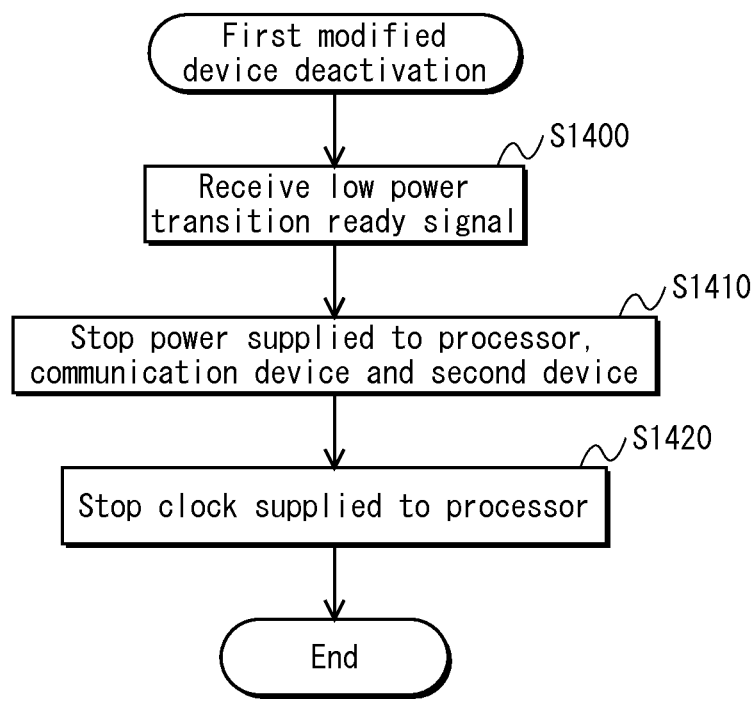
FIG. 14 is a flowchart of first modified device deactivation.

FIG. 14 is a flowchart of the first modified device deactivation.

Step S1400 and step S1420 are respectively the same as step S900 and step S920 in the device deactivation (see FIG. 9) pertaining to Embodiment 1 Therefore descriptions of these processing are omitted here. The following description focuses on processing other than these processing.

The first modified device deactivation starts when the processor 120 transmits a low power transition ready signal to the power control device 1060 whose operation state is in the first state.

Upon commencement of the first modified device deactivation, the virtual machine system 1000 starts processing of step S1400.

Upon completion of the processing of step S1400, the power control device 1060 stops power supplied to the circuits constituting the integrated circuit 110 (processor 120, the memory 130, etc.), the communication device 1080, and the second device 190 (step S1410).

Upon completion of step S1410, the virtual machine system 1000 executes processing of step S1420.

On completion of the processing of step S1420, the virtual machine system 1000 ends the first modified device deactivation.

<Consideration>

Even when the virtual machine system 1000 with the above structure attempts to deactivate virtual machines whose operations are controlled thereby while one of the virtual machines is executing one task to perform the response waiting of waiting for a response from a server, the virtual machine system 1000 executes network disconnection of permitting the virtual machine to stop operating even before the completion of the response waiting at the highest execution priority. This allows the virtual machine system 1000 to deactivate the virtual machine in a rather short time.

<Embodiment 3>

(Outline)

A virtual machine system 1500 that is a partially modified version of the virtual machine system 100 pertaining to Embodiment 1 is described below, as an embodiment of a virtual machine system pertaining to the present invention.

The virtual machine system 100 pertaining to Embodiment 1 is an example of a structure for being connected to the first device 180 and the second device 190. The virtual machine system 1500 pertaining to Embodiment 3 is connected to a storage device 1580 instead of the first device 180.

When a virtual machine whose operations are controlled by the virtual machine system 1500 receives the processing time reducing signal from the hypervisor while executing data writing and not completing update of the file system management information, the virtual machine system 1500 executes recovery processing at the highest execution priority so as to permit the virtual machine to safely stop operating without waiting for the completion of the data writing. The data writing is processing of writing data including update of file system management information in the storage device 1580. The recovery processing is processing of only executing update of the file system management information. Upon completion of the recovery processing, the virtual machine system transmits a VM deactivation canceling signal to the hypervisor.

The following describes the structure of the virtual machine system 1500 pertaining to Embodiment 3 with reference to the drawings, focusing on the differences from the virtual machine system 100 pertaining to Embodiment 1.

<Structure>

Figure 15:
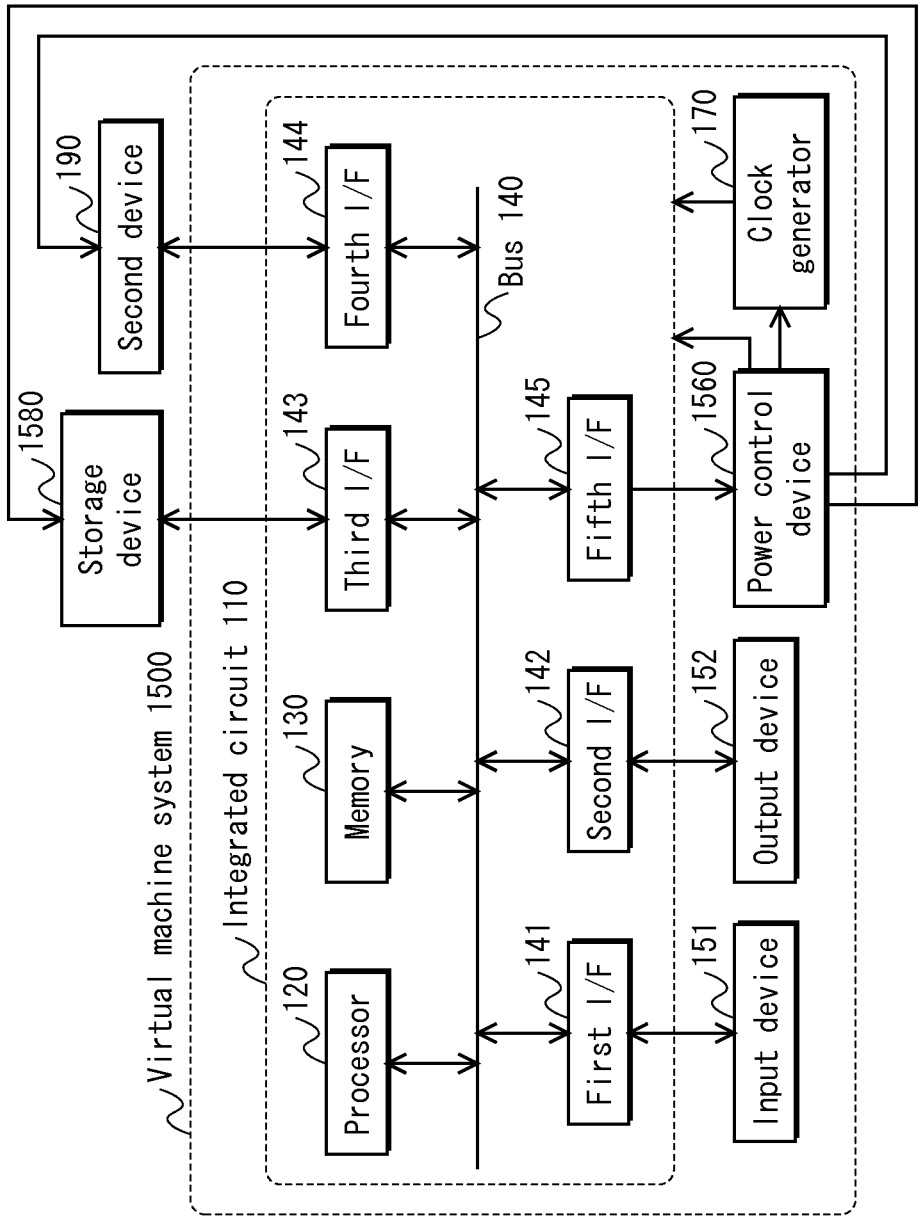
FIG. 15 is a block diagram showing the principal hardware structure of a virtual machine system 1500.

FIG. 15 is a block diagram showing the principal hardware structure of the virtual machine system 1500.

As shown in FIG. 15, the virtual machine system 1500 differs from the virtual machine system 100 pertaining to Embodiment 1 in that the power control device 160 is modified to a power control device 1560. The hardware of the integrated circuit 110 is not modified from the integrated circuit 110 of the virtual machine system 100 pertaining to Embodiment 1, but part of the software stored in the memory 130 is modified.

The virtual machine system 100 pertaining to Embodiment 1 is an example of a structure for being connected to the first device 180 and the second device 190. The virtual machine system 1500 pertaining to Embodiment 3 is connected to a storage device 1580 pertaining to Embodiment 3 instead of the first device 180 pertaining to Embodiment 1.

The power control device 1560 is a modification of the power control device 160 pertaining to Embodiment 1. The power control device 1560 supplies power to the storage device 1580 instead of the first device 180, and is connected to the fifth I/F 145, the clock generator 170, the communication device 1080, the second device 190 and the integrated circuit 110.

The storage device 1580 is connected to the third I/F 143 and the power control device 160, and controlled by the processor 120 that executes programs. The storage device 1580 operates with power supplied from the power control device 160. For example, the storage device is a memory card reader/writer that reads data from an inserted nonvolatile memory card, and writes data in the inserted nonvolatile memory card.

The following describes the functional structure of the virtual machine system 1500 with the above hardware structure with reference to the drawings.

Figure 16:
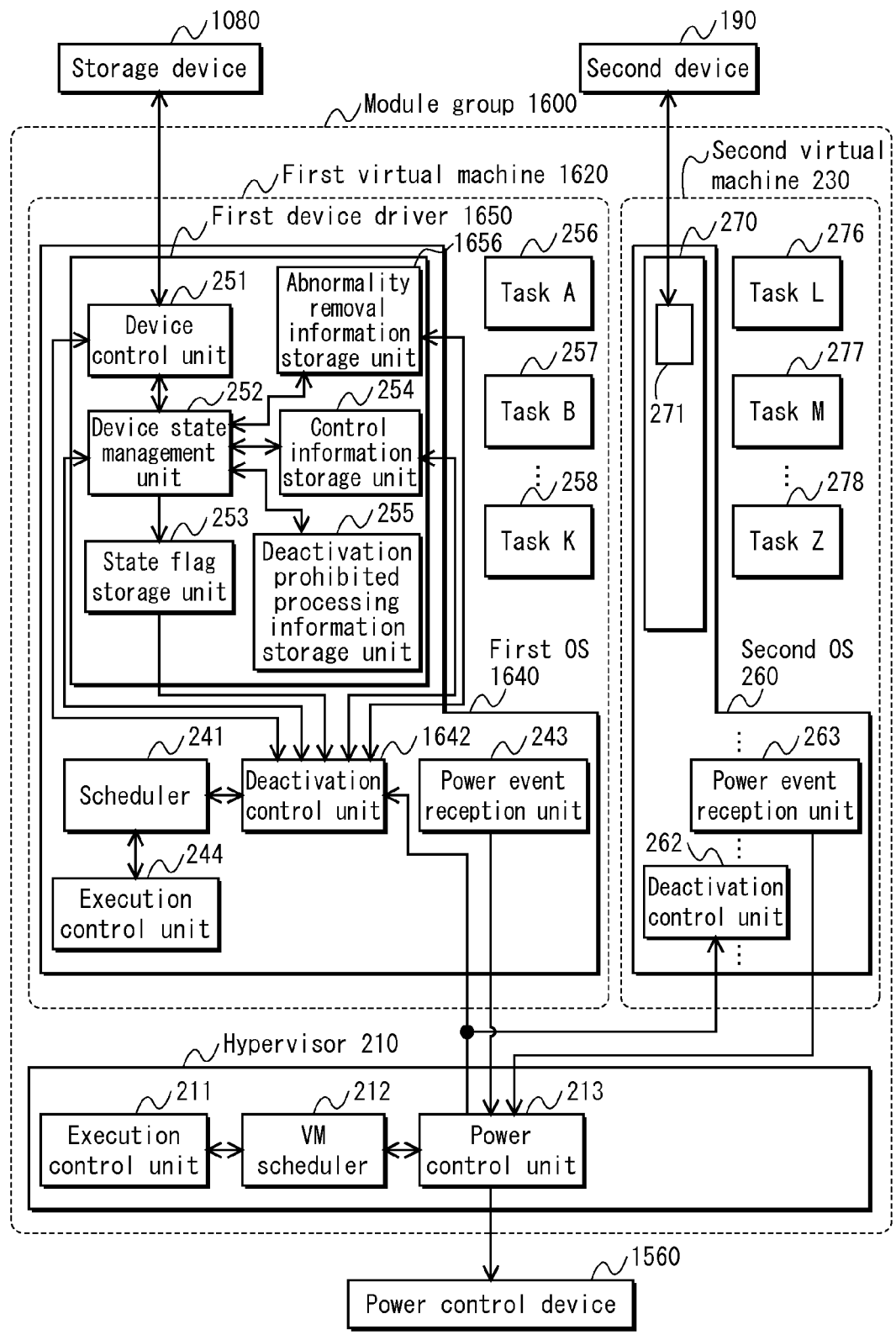
FIG. 16 is a schematic diagram showing a program module group 1600.

FIG. 16 is a schematic diagram showing a module group 1600 that is executed on the processor 120.

As shown in FIG. 16, the module group 1600 is a modification of the module group 200 pertaining to Embodiment 1. The deactivation control unit 242 is modified to be a deactivation control unit 1642, and an abnormality removal information storage unit 1656 is added. Due to these changes and addition, the first device driver 250 is modified to be a first device driver 1650, the first OS 240 is modified to be a first OS 1640, and the first virtual machine 220 is modified to be a first virtual machine 1620.

The abnormality removal information storage unit 1656 is connected to the device state management unit 252. The abnormality removal information storage unit 1656 stores therein first modified abnormality removal information 1700.

FIG. 17 shows an example of the data structure of the first modified abnormality removal information 1700 stored in the abnormality removal information storage unit 1656.

As shown in FIG. 17, the first modified abnormality removal information 1700 includes a deactivation prohibited processing ID 1710 and an abnormality removal ID 1720 in association with each other.

The deactivation prohibited processing ID 1710 identifies deactivation prohibited processing that is associated in advance with abnormality removal among the deactivation prohibited processing identified by the deactivation prohibited processing IDs 410 included in the deactivation prohibited processing information 400 (see FIG. 4) stored by the deactivation prohibited processing information storage unit 255. In this example, the deactivation prohibited processing identified by the deactivation prohibited processing ID 1710 is a data writing including update of file system management information. Here, the data writing including update of file system management information is processing of writing data including update of file system management information in a nonvolatile memory card in the storage device 1580. When the virtual machine system 1500 interrupts and ends the data writing including update of the file system management information while executing the data writing and not completing the update of the file system management information, the file system management information might not be accurately updated. This might lead to an inconvenience that data cannot be correctly read from the nonvolatile memory card in the storage device 1580 even when all data stored in the nonvolatile memory card is not subject to the data writing including update of the file system management information.

The abnormality removal ID 1720 is an identifier for, when deactivation prohibited processing identified by a corresponding deactivation prohibited processing ID 1710 is being executed, causing the virtual machine (here, the first virtual machine 1620) to safely stop operating without waiting for the completion of the deactivation prohibited processing. The abnormality removal ID 1720 identifies predetermined processing associated with the deactivation prohibited processing. In this example, abnormality removal identified by the abnormality removal ID 1720 is recovery processing. Here, the recovery processing only includes updating of file system management information associated therewith among the data writing processing including the updating of file system management information. Even when the virtual machine system 1500 is executing the data writing including update of the file system management information and the update of the file system management information is not complete, the virtual machine system 1500 can at least execute update of the file system management information by executing the recovery processing. Therefore, even when the data writing including update of the file system management information is not complete, if the recovery processing is complete, this prevents an inconvenience that data not subject to the data writing including update of the file system management information among all data stored in the nonvolatile memory card cannot be correctly read.

The deactivation control unit 1642 has the functions that are partially modified from the deactivation control unit 242 pertaining to Embodiment 1. The deactivation control unit 1642 is connected to the scheduler 241, the device control unit 251, the device state management unit 252, the state flag storage unit 253, the control information storage unit 254, the abnormality removal information storage unit 1656 and the power control unit 213. The deactivation control unit 1642 has the following first modified priority change function in addition to the response function of the deactivation control unit 242 pertaining to Embodiment 1 and the modified VM deactivation prohibition cancel function pertaining to Embodiment 2.

First modified priority change function: a function of referring to the control information 300 (see FIG. 3) stored in the control information storage unit 254 and the first modified abnormality removal information 1700 (see FIG. 17) stored in the abnormality removal information storage unit 1656 upon receiving the processing time reducing signal from the power control unit 213, (1) when the task ID 320 matches the deactivation prohibited processing ID 1710 (i.e., the device control identified by the task ID 320 is data writing including update of file system management information) and the update of the file system management information is not complete, stopping the deactivation prohibited processing identified by the deactivation prohibited processing ID 1710 and transmitting the abnormality removing signal to the scheduler 241, the abnormality removing signal indicating that the abnormality removal identified by the abnormality removal ID 1720 (i.e., recovery processing) is to be executed at the highest execution priority, and (2) when the task ID 320 does not match the deactivation prohibited processing ID 1710 (i.e., the device control identified by the task ID 320 is not data writing including update of file system management information), transmitting the priority changing signal to the scheduler 241. The priority changing signal instructs the scheduler 241, which manages the execution priorities, to give the highest execution priorities to the device involving task identified by the task ID 320 and the relevant task identified by the relevant task ID 330.

The following describes an operation executed by the virtual machine system 1500 described above with reference to the drawings.

<Operations>

The virtual machine system 1500 characteristically executes the second modified processing time reduction and the second modified device deactivation in addition to the VM deactivation requesting, the response processing, and the power state changing processing pertaining to Embodiment 1. The following describes the second modified processing time reduction and the second modified device deactivation.

<Second Modified Processing Time Reduction>

The second modified processing time reduction is partially modified from the processing time reduction pertaining to Embodiment 1. The second modified processing time reduction is mainly executed by the first OS 1640. In the second modified processing time reduction, the first OS 1640 refers to the control information 300 (see FIG. 3) stored in the control information storage unit 254 and the abnormality removal information 1200 (see FIG. 12) stored in the abnormality removal information storage unit 1156 when receiving the processing time reducing signal from the power control unit 213, (1) when task ID 320 matches deactivation prohibited processing ID 1710 and update of the file system management information is not complete, stops the deactivation prohibited processing identified by the deactivation prohibited processing ID 1710 and executes the abnormality removal identified by the abnormality removal ID 1720 at the highest execution priority, (2) when task ID 320 does not match deactivation prohibited processing ID 1710, controls the execution of the device involving task identified by the task ID 320 and the relevant task identified by the relevant task ID 330 after giving the highest execution priorities to these tasks.

Figure 18:
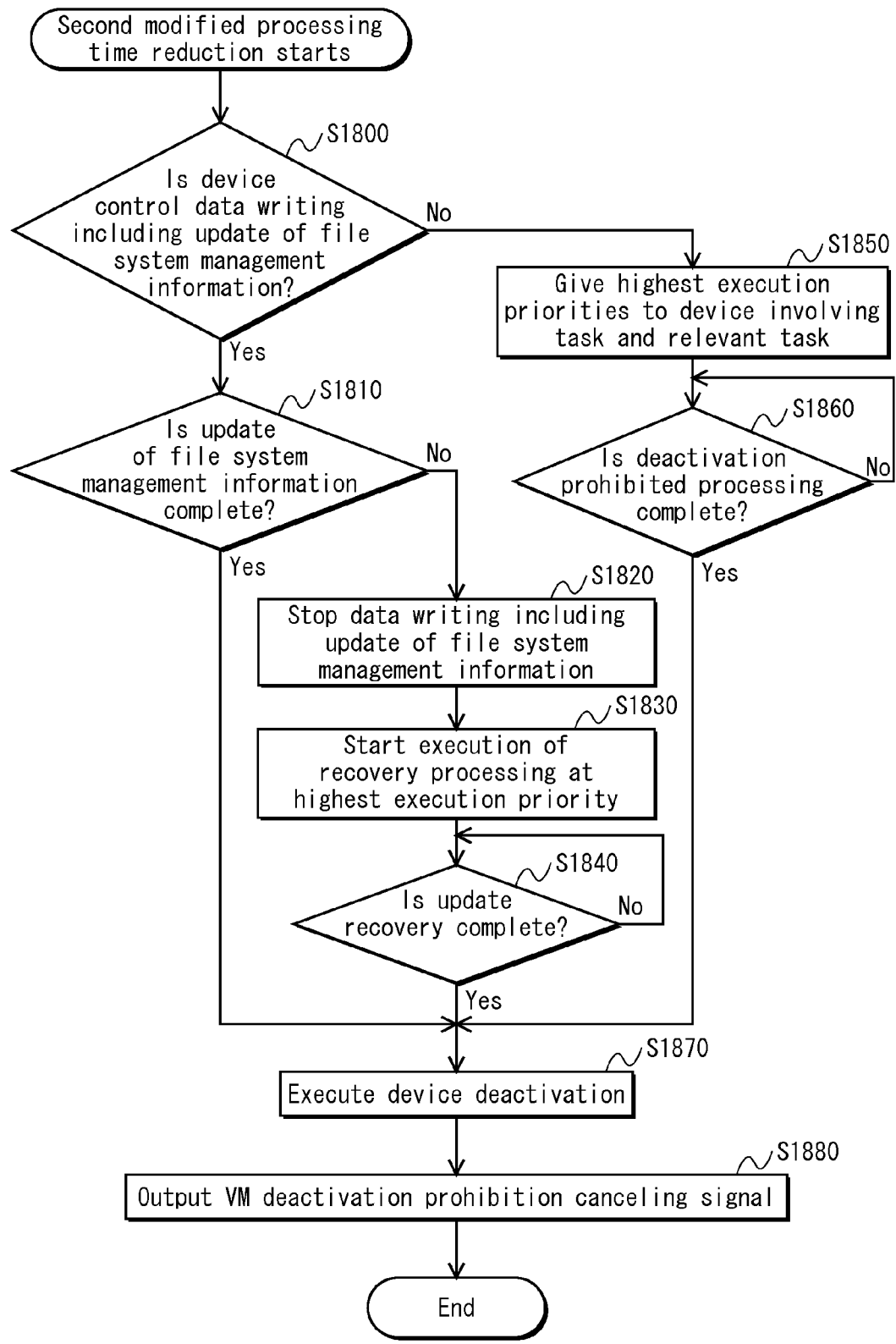
FIG. 18 is a flowchart of second modified processing time reduction.

FIG. 18 is a flowchart of the second modified processing time reduction.

Step S1830 through step S1880 are respectively the same as step S700 through step S730 in the processing time reduction (see FIG. 7) pertaining to Embodiment 1. Therefore descriptions of these processing are omitted here. The following description focuses on processing other than these processing.

The second modified processing time reduction starts when the deactivation control unit 1642 receives the processing time reducing signal transmitted by the power control unit 213.

Upon commencement of second modified processing time reduction, the deactivation control unit 1642 refers to the control information 300 (see FIG. 3) stored in the control information storage unit 254 and the first modified abnormality removal information 1700 (see FIG. 17) stored in the abnormality removal information storage unit 1656, and determines whether the task ID 320 matches the deactivation prohibited processing ID 1210 (i.e., whether device control identified by the task ID 320 is the data writing including update of the file system management information) (step S1800).

When the processing of step S1800 is the data writing including update of the file system management information (step S1800: Yes), the deactivation control unit 1642 determines whether update of the file system management information is complete in the processing (step S1810).

When update of the file system management information is not complete in the processing of step S1810 (step S1810: No), the deactivation control unit 1642 stops the data writing including update of the file system identified by the deactivation prohibited processing ID 1710, and transmits the abnormality removing signal to the scheduler 241. The abnormality removing signal indicates that the recovery processing identified by the abnormality removal ID 1720 is to be executed at the highest execution priority. The scheduler 241 performs scheduling of tasks whose execution is controlled by the first OS 1640 such that the recovery processing has the highest execution priority after the data writing including update of the file system stops. The execution control unit 244 stops the data writing including update of the file system (step S1820) and controls the execution of the recovery processing at the highest execution priority based on the scheduling provided by the scheduler 241 (step S1830).

The processing in step S1800 is not the data writing including update of the file system management information (step S1800: No), the virtual machine system 1500 executes processing from step S1850 to step S1860.

In the processing of step S1810, the virtual machine system 1500 executes processing from step S1870 to step S1880 in the following three cases: when update of the file system management information is complete (step S1810: Yes); when the recovery processing is complete after the completion of the processing of step S1830 (when the result of step S1840 is Yes after a repeated result of No); and when the deactivation prohibited processing is completed in the processing of step S1860 (step S1860: Yes).

Upon completion of the processing of step S1880, the virtual machine system 1500 ends the second modified processing time reduction.

<Second Modified Device Deactivation Function>

The second modified device deactivation is partially modified from the device deactivation pertaining to Embodiment 1. The second modified device deactivation is mainly executed by the power control device 1560 and the clock generator 170. The second modified device deactivation is processing of stopping power supplied to the processor 120, the storage device 1580 and the second device 190, and of stopping clock signal supplied to the processor 120.

Figure 19:
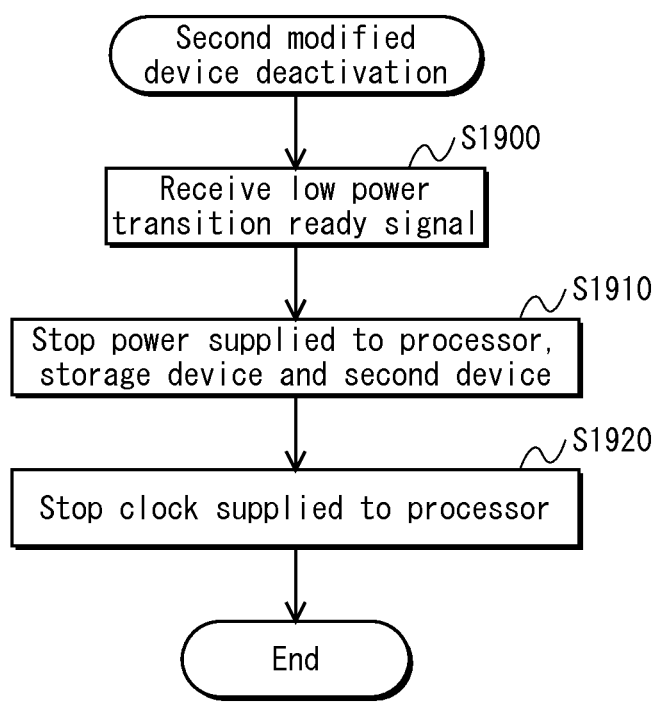
FIG. 19 is a flowchart of second modified device deactivation.

FIG. 19 is a flowchart of the second modified device deactivation.

Step S1900 and step S1920 are respectively the same as step S900 and step S920 in the device deactivation (see FIG. 9) pertaining to Embodiment 1 Therefore descriptions of these processing are omitted here. The following description focuses on processing other than these processing.

The second modified device deactivation starts when the processor 120 transmits a low power transition ready signal to the power control device 1560 whose operation state is in the first state.

Upon commencement of the second modified device deactivation, the virtual machine system 1500 starts processing of step S1900.

Upon completion of the processing of step S1900, the power control device 1560 stops power supplied to the circuits constituting the integrated circuit 110 (processor 120, the memory 130, etc.), the storage device 1580, and the second device 190 (step S1910).

Upon completion of step S1910, the virtual machine system 1500 executes processing of step S1920.

On completion of the processing of step S1920, the virtual machine system 1500 ends the second modified device deactivation.

<Consideration>

Even when the virtual machine system 1500 with the above structure attempts to deactivate virtual machines whose operations are controlled thereby while one of the virtual machines is executing one task to perform data writing including update of file system management information, the virtual machine system 1500 executes recovery processing of permitting the virtual machine to stop operating even before the completion of the data writing including update of the file system management information at the highest execution priority. This allows the virtual machine system 1500 to deactivate the virtual machine in a rather short time.

<Embodiment 4>

(Outline)

A modified virtual machine system that is a partially modified version of the virtual machine system 1500 pertaining to Embodiment 3 is described below, as an embodiment of a virtual machine system pertaining to the present invention.

The hardware of the modified virtual machine system is not modified from the virtual machine system 1500 pertaining to Embodiment 3, but part of the software stored in the memory 130 is modified. Due to this change, part of functions realized by the modified virtual machine system is modified from the functions realized by the virtual machine system 1500.

When a virtual machine whose operations are controlled by the modified virtual machine system receives the processing time reducing signal from the hypervisor while executing data writing not including update of file system management information in the storage device 1580 (hereinafter, this function is simply referred to as "data writing"), the modified virtual machine system stops the data writing. Instead of this, the modified virtual machine system executes storage state recording at the highest execution priority. The storage state recording is processing of recording a state of data written in the nonvolatile memory card in the storage device 1580 in a predetermined memory area of the flush memory included in the memory 130. Upon completion of the storage state recording, the modified virtual machine system transmits a VM deactivation canceling signal to the hypervisor.

The following describes the functional structure with reference to the drawings.

Figure 20:
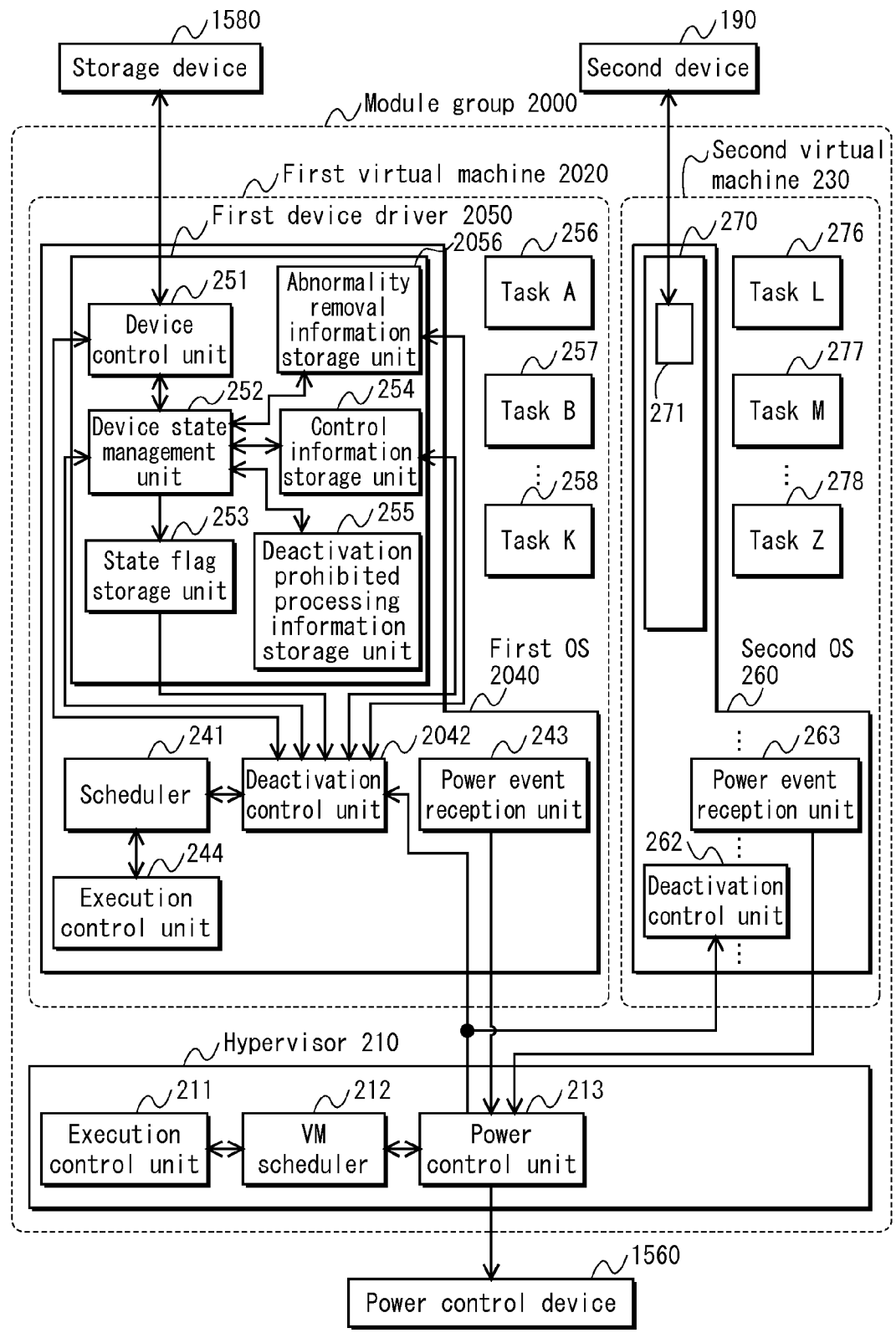
FIG. 20 is a schematic diagram showing a program module group 2000.

FIG. 20 is a schematic diagram showing a module group 2000 that is executed on the processor 120.

As shown in FIG. 20, the module group 2000 is a modification of the module group 1600 pertaining to Embodiment 3. The deactivation control unit 1642 is modified to be a deactivation control unit 2042, and the abnormality removal information storage unit 1656 is modified to be an abnormality removal information storage unit 2056. Due to these changes, the first device driver 1650 is modified to be a first device driver 2050, the first OS 1640 is modified to be a first OS 2040, and the first virtual machine 1620 is modified to be a first virtual machine 2020.

The abnormality removal information storage unit 2056 is connected to the device state management unit 252. The abnormality removal information storage unit 2056 stores therein second modified abnormality removal information 2100.

FIG. 21 shows an example of the data structure of the second modified abnormality removal information 2100 stored in the abnormality removal information storage unit 2056.

As shown in FIG. 21, the second modified abnormality removal information 2100 includes a deactivation prohibited processing ID 2110 and an abnormality removal ID 2120 in association with each other.

The deactivation prohibited processing ID 2110 is the same as the deactivation prohibited processing ID 2110 in the second modified abnormality removal information 1700 (see FIG. 17) pertaining to Embodiment 2. However, in this example, the deactivation prohibited processing identified by the deactivation prohibited processing ID 2110 is data writing (i.e., data writing not including update of file system management information). When the modified virtual machine system interrupts and ends the data writing while the data writing is being executed, the following inconvenience might occur. That is, when attempting to execute the data writing next time, it is impossible to know how much the data was written and portion already written is required to be written again.

The abnormality removal ID 2120 is the same as the deactivation prohibited processing ID 2110 in the second modified abnormality removal information 1700 pertaining to Embodiment 2. However, in this example, the abnormality removal identified by the abnormality removal ID 1720 is storage state recording. As described above, the storage state recording is processing of recording, in a predetermined memory area of the flush memory included in the memory 130, a state of data written in the nonvolatile memory card in the storage device 1580 at a time of receiving the processing time reducing signal from the hypervisor while executing the data writing associated therewith.

Even when the modified virtual machine system interrupts and ends the data writing by receiving the processing time reducing signal from the hypervisor while the data writing is being executed, the modified virtual machine system knows how much the data is written in the interrupted data writing by executing the storage state recording. Therefore, this prevents the inconvenience that portion already written is required to be written again.

The deactivation control unit 2042 has the functions that are partially modified from the deactivation control unit 1642 pertaining to Embodiment 3. The deactivation control unit 2042 is connected to the scheduler 241, the device control unit 251, the device state management unit 252, the state flag storage unit 253, the control information storage unit 254, the abnormality removal information storage unit 2056 and the power control unit 213. The deactivation control unit 2042 has the following second modified priority change function in addition to the response function of the deactivation control unit 242 pertaining to Embodiment 1 and the modified VM deactivation prohibition cancel function of the deactivation control unit 1142 pertaining to Embodiment 2.

Second modified priority change function: a function of referring to the control information 300 (see FIG. 3) stored in the control information storage unit 254 and the second modified abnormality removal information 2100 (see FIG. 21) stored in the abnormality removal information storage unit 2056 upon receiving the processing time reducing signal from the power control unit 213, (1) when the task ID 320 matches the deactivation prohibited processing ID 2110 (i.e., the device control identified by the task ID 320 is data writing), stopping the deactivation prohibited processing identified by the deactivation prohibited processing ID 2110 and transmitting, to the scheduler 241, the abnormality removing signal indicating that the abnormality removal identified by the abnormality removal ID 2120 (i.e., storage state recording) is to be executed at the highest execution priority, and (2) when the task ID 320 does not match the deactivation prohibited processing ID 2110 (i.e., the device control identified by the task ID 320 is not data writing), transmitting, to the scheduler 241. The priority changing signal instructs the scheduler 241, which manages the execution priorities, to give the highest execution priorities to the device involving task identified by the task ID 320 and the relevant task identified by the relevant task ID 330.

The following describes an operation executed by the modified virtual machine system described above with reference to the drawings.

<Operations>

The modified virtual machine system characteristically executes the third modified processing time reduction in addition to the VM deactivation requesting, the response processing, and the power state changing processing pertaining to Embodiment 1 and the second modified device deactivation pertaining to Embodiment 3. The following describes the third modified processing time reduction.

<Third Modified Processing Time Reduction>

The third modified processing time reduction is partially modified from the processing time reduction pertaining to Embodiment 1. The third modified processing time reduction is mainly executed by the first OS 2040. In the third modified processing time reduction, the first OS 2040 refers to the control information 300 (see FIG. 3) stored in the control information storage unit 254 and the first modified abnormality removal information 2100 (see FIG. 21) stored in the abnormality removal information storage unit 2056 when receiving the processing time reducing signal from the power control unit 213, (1) when task ID 320 matches deactivation prohibited processing ID 2110, stops the deactivation prohibited processing identified by the deactivation prohibited processing ID 2110 and executes the execution of the abnormality removal identified by the abnormality removal ID 2120 at the highest execution priority, (2) when task ID 320 does not match deactivation prohibited processing ID 2110, controls the execution of the device involving task identified by the task ID 320 and the relevant task identified by the relevant task ID 330 after giving the highest execution priorities to these tasks.

Figure 22:
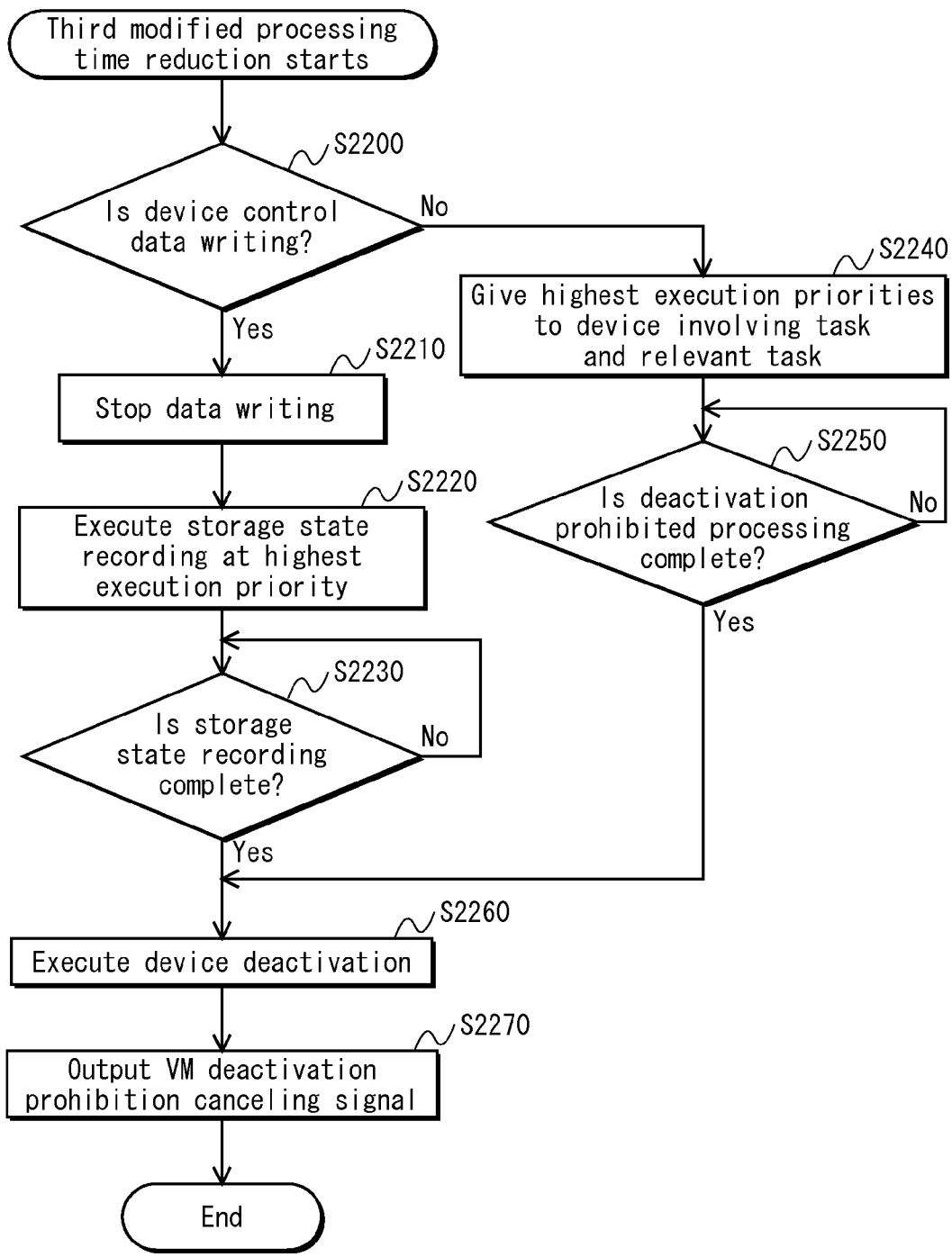
FIG. 22 is a flowchart of third modified processing time reduction.

FIG. 22 is a flowchart of the third modified processing time reduction.

Step S2240 through step S2270 are respectively the same as step S700 through step S730 in the processing time reduction (see FIG. 7) pertaining to Embodiment 1. Therefore descriptions of these processing are omitted here. The following description focuses on processing other than these processing.

The third modified processing time reduction starts when the deactivation control unit 2042 receives the processing time reducing signal transmitted by the power control unit 213.

Upon commencement of third modified processing time reduction, the deactivation control unit 2042 refers to the control information 300 (see FIG. 3) stored in the control information storage unit 254 and the first modified abnormality removal information 2100 (see FIG. 21) stored in the abnormality removal information storage unit 2056, and determines whether the task ID 320 matches the deactivation prohibited processing ID 1210 (i.e., whether device control identified by the task ID 320 is the data writing) (step S2200).

When the device control is the data writing in the processing of step S2200 (step S2200: Yes), the deactivation control unit 2042 stops the data writing identified by the deactivation prohibited processing ID 2110 and transmits the abnormality removing signal to the scheduler 241. The abnormality removing signal indicates that the storage state recording identified by the abnormality removal ID 2120 is to be executed at the highest execution priority. The scheduler 241 performs scheduling of tasks whose execution is controlled by the first OS 2040 such that the storage state recording has the highest execution priority after the data writing including update of the file system stops. The execution control unit 244 stops the data writing (step S2210) and controls the execution of the storage state recording at the highest execution priority based on the scheduling provided by the scheduler 241 (step S2220).

The device control is not the data writing in step S2000 (step S2000: No), the modified virtual machine system executes processing from step S2240 to step S2250.

When the storage state recording is completed after the processing of step S2220 is completed (when the result of step S2230 is Yes after a repeated result of No), and when the deactivation prohibited processing is completed in step S2250 (step S2250: Yes), the modified virtual machine system executes processing from step S2260 to step S2270.

Upon completion of the processing of step S2270, the modified virtual machine system ends the third modified processing time reduction.

<Consideration>

Even when the modified virtual machine system with the above structure attempts to deactivate virtual machines whose operations are controlled thereby while one of the virtual machines is executing one task to perform data writing, the modified virtual machine system causes the virtual machine to execute the storage state recording of permitting the virtual machine to stop operating even before the completion of the data writing at the highest execution priority. This allows the modified virtual machine system to deactivate the virtual machine in a rather short time.

<Supplement>

Four embodiments of the virtual machine system pertaining to the present invention have been described above by using Embodiments 1 through 4, as examples. However, the following modifications may also be applied, and the present invention should not be limited to the virtual machine systems according to the embodiment and so on described above.

(1) In Embodiment 1, the power control device 160 whose operation state is in the second state does not supply power to the circuits constituting the integrated circuit 110 (processor 120, the memory 130, etc.). However, if a potential of power supplied to the circuits constituting the integrated circuit 110 when the power control device 160 is in the second state is lower than a potential of power supplied to the circuits constituting the integrated circuit 110 when the power control device 160 is in the first state, i.e., if the power consumption of the integrated circuit 110 when the power control device 160 is in the second state can be set lower than the power consumption of the integrated circuit 110 when the power control device 160 is in the first state, the power control device 160 whose operation state is in the second state does not necessarily have to have the structure of not supplying power to the circuits constituting the integrated circuit 110

For example, it is considered that the power control device 160 whose operation state is the second state supplies the circuits constituting the integrated circuit 110 with the lower limit voltage at which the memory 130 can continue storing data (e.g., 0.5 V). In this case, when the power control device 160 is in the second state, the clock generator 170 stops supplying the clock signal. Accordingly, the processor 120 stops operating, but the memory 130 maintains the state where the data can be stored.

Alternatively, as another example, when the power control device 160 whose operation state is in the second state supplies the integrated circuit 110 with the power of the lower limit voltage with which the integrated circuit 110 operates normally with the frequency of 500 MHz (e.g., 0.9 V), and the clock generator 170 supplies the integrated circuit 110 with a clock signal operating at a frequency of 500 MHz. In this case, when the power control device 160 is in the second state, the integrated circuit 110 operates with the frequency of 500 MHz.

(2) In Embodiment 1, the hypervisor 210 controls the operations of the two OSs, i.e., the first OS 240 and the second OS 260. However, if the hypervisor 210 can control the operations of one or more OSs, the number of the OSs whose operations are controlled by the hypervisor 210 is not limited to two. For example, the operations of four OSs may be controlled by the hypervisor 210.

(3) In Embodiment 1, the first device driver 250 includes the state flag storage unit 253 that stores therein the state flag indicating whether the first virtual machine 220 is executing the deactivation prohibited processing, and the deactivation control unit 242 refers to the state flag stored by the state flag storage unit 253 to determine whether the first virtual machine 220 is executing the deactivation prohibited processing. However, if the deactivation control unit 242 can obtain information for determining whether the first virtual machine 220 is executing the deactivation prohibited processing when necessary, the first device driver 250 does not necessarily include the state flag storage unit 253, and the deactivation control unit 242 does not necessarily refer to the state flag stored by the state flag storage unit 253 to determine whether the first virtual machine 220 is executing the deactivation prohibited processing.

For example, each time when necessary, the deactivation control unit 242 asks the device state management unit 252 whether the first virtual machine 220 is executing the deactivation prohibited processing, and each time of asking, the device state management unit 252 outputs, to the deactivation control unit 242, a signal indicating whether the first virtual machine 220 is executing the deactivation prohibited processing.

(4) In Embodiment 1, upon receiving the processing time reducing signal, the first OS 240 executes the device involving task and the relevant task at the highest execution priorities so as to reduce a time period taken to complete the deactivation prohibited processing that is being executed. However, the device involving task and the relevant task are not necessarily executed at the highest execution priorities if it is possible to reduce a time period taken to complete the deactivation prohibited processing that is being executed. For example, it is considered to reduce a time period taken to complete the deactivation prohibited processing that is being executed by not executing part of processing irrelevant to the deactivation prohibited processing.

(5) In Embodiment 4, when the interrupted data writing is executed again, the storage state recording enables the modified virtual machine system to know how much the data was written in the interrupted data writing. However, if it is possible to know how much the data was written in the interrupted data writing when the interrupted data writing is executed again, the storage state recording is not necessarily executed and another processing may be executed. For example, the processing may be of recording a state of data written in the nonvolatile memory card in the storage device 1580 at the time of receiving the processing time reducing signal in the predetermined memory area of the nonvolatile memory card.

(6) In Embodiment 1, the processor 120, the memory 130, the bus 140, the first interface (I/F) 141, the second I/F 142, the third I/F 143, the fourth I/F 144 and the fifth I/F 145 are integrated into the integrated circuit 110. However, if the same functions of the integrated circuit 110 can be realized, these components are not necessarily integrated into one integrated circuit. These components may be integrated into a plurality of integrated circuits. Generally, integrated circuits may be referred to as, for example, an integrated circuit (IC), large scale integration (LSI), super LSI, or ultra LSI depending on the degree of integration. Furthermore, the scheme of integrated circuit assembly is not limited to LSI. A dedicated circuit or a general-purpose processor may be used. A Field Programmable Gate Array (FPGA), which is an LSI that can be programmed after manufacture, or a reconfigurable processor, which is an LSI whose connections between internal circuit cells and settings for each circuit cell can be reconfigured, may be used. Additionally, if technology for integrated circuits that replaces LSIs emerges, owing to advances in semiconductor technology or to another derivative technology, the integration of functional blocks may naturally be accomplished using such technology. Among such technology, the application of biotechnology or the like is possible.

(7) The above Embodiments and Modifications may be combined with one another.

(8) Each of the virtual machine system 100, the virtual machine system 1000, the virtual machine system 1500 and the modified virtual machine system are applicable to computers, electronic equipment, information devices, Audio Visual (AV) devices, communication devices, household electrical appliances and the like, if each of them is a system of controlling the operations of one or more virtual machines. For example, these virtual machine systems are applicable to personal computers, mobile communication terminals (mobile phones, smart phones, Personal Digital Assistant (PDA), etc.), televisions, hard disk recorders, optical disc recorders, optical disc players, car navigation systems and the like.

(9) Further Embodiments and modifications of the virtual machine system pertaining to an embodiment of the present invention are described below, along with the effects thereof.

(a) A virtual machine system pertaining to an embodiment of the present invention is a virtual machine system for implementing one or more virtual machines and a deactivator that deactivates the one or more virtual machines, comprising: a processor utilizing a device; and a memory storing therein a program executed by the processor, the virtual machine system causing the processor to execute the program stored in the memory to implement the one or more virtual machines and the deactivator, wherein each of the one or more virtual machines includes an output unit that outputs a deactivation prohibiting signal while the virtual machine is executing deactivation prohibited processing, the deactivation prohibited processing being processing that involves the device and during which the virtual machine is not permitted to stop operating, the deactivation prohibiting signal indicating that the virtual machine is not permitted to stop operating, and the deactivator deactivates a virtual machine among the one or more virtual machines that does not output the deactivation prohibiting signal, and does not deactivate a virtual machine among the one or more virtual machines that outputs the deactivation prohibiting signal.

In general, processing involving a device executed by a virtual machine does not necessarily cause inconveniences when it is stopped before its completion. Therefore, even while the virtual machine is executing the processing involving a device, if the processing does not cause inconveniences when it is stopped before its completion, the inconveniences do not occur even when the virtual machine stops operating without waiting for the processing to complete.

According to the virtual machine system pertaining to the present invention with the above structure, even when a virtual machine executes processing involving a device, if the processing is not deactivation prohibited processing, the deactivator deactivates the virtual machine. Thus, the virtual machine system treats, as deactivation prohibited processing, processing that might cause inconveniences when the virtual machine is stopped before completion of the processing. As a result, the virtual machine system is more likely to safely deactivate a virtual machine that uses a device in a shorter time than conventional systems.

Figure 23:
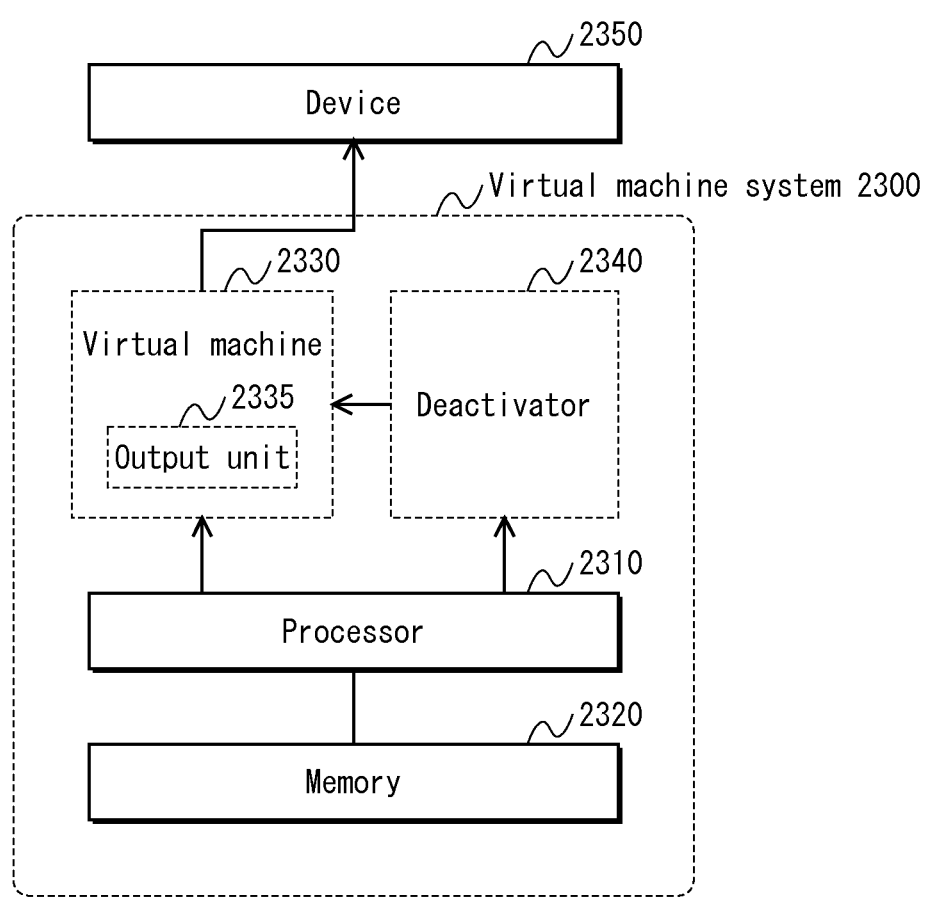
FIG. 23 is a block diagram showing the structure of a virtual machine system 2300.

FIG. 23 is a block diagram showing the structure of a virtual machine system 2300 in the above modification.

As shown in FIG. 23, the hardware of the virtual machine system 2300 consists of a processor 2310 and a memory 2320, and includes a virtual machine 2330 and a deactivator 2340 that are implemented by executing programs stored in the memory 2320 by the processor 2310. The virtual machine 2330 includes an output unit 2335. The virtual machine system 2300 is connected to the device 2350.

The processor 2310 uses the device 2350, and implements the virtual machine 2330 and the deactivator 2340 by executing the programs stored in the memory 2320. For example, the processor 2310 is realized as the processor 120 in Embodiment 1.

The memory 2320 stores therein programs utilized by the processor 2310. For example, the memory 2320 is realized as the memory 130 in Embodiment 1.

The device 2350 is utilized by the processor 2310. For example, the device 2350 is realized as the first device 180 in Embodiment 1.

The virtual machine 2330 is provided by the processor 2310 executing the programs stored in the memory 2320. For example, the virtual machine 2330 is implemented as the first virtual machine 220 in Embodiment 1.

While the virtual machine 2330 is executing deactivation prohibited processing, the output unit 2335 outputs a deactivation prohibiting signal indicating that the virtual machine is not permitted to stop operating. The deactivation prohibited processing is a processing that involves the device 2350 and during which the virtual machine 2330 is not permitted to stop operating. For example, the output unit 2335 is implemented as the first device driver 250 in Embodiment 1.

The deactivator 2340 is implemented by the processor 2310 executing programs stored in the memory 2320, and deactivates the virtual machine 2330. Here, the deactivator 2340 deactivates the virtual machine 2330 that does not output the deactivation prohibiting signal, and does not deactivate the virtual machine 2330 that outputs the deactivation prohibiting signal. For example, the deactivator 2340 is implemented as the hypervisor 210 in Embodiment 1.

(b) The deactivator may include a deactivating signal output unit that outputs a deactivating signal to the virtual machine that outputs the deactivation prohibiting signal, the deactivating signal indicating that the virtual machine needs to stop operating, and each of the one or more virtual machines may include a processing time reduction unit that executes processing time reduction when the deactivator outputs the deactivating signal to the virtual machine while the virtual machine is executing the deactivation prohibited processing, the processing time reduction being processing of reducing a time period taken to complete the deactivation prohibited processing.

This structure enables the virtual machine that is executing the deactivation prohibited processing to reduce the processing time of the deactivation prohibited processing.

(c) The processing time reduction unit may execute, as the processing time reduction, processing of giving the highest priority of execution among processing executed by the virtual machine to the deactivation prohibited processing that is being executed.

This structure reduces the processing time of the deactivation prohibited processing executed by the virtual machine by giving the highest execution priority to the deactivation prohibited processing executed by the virtual machine.

(d) The deactivator may include a deactivating signal output unit that outputs a deactivating signal to the virtual machine that outputs the deactivation prohibiting signal, the deactivating signal indicating that the virtual machine needs to stop operating, at least one of the virtual machines may include an abnormality removal unit that executes abnormality removal when the deactivator outputs the deactivating signal to the one virtual machine while the one virtual machine is executing the deactivation prohibited processing, the abnormality removal being processing of removing an abnormal state of the device resulting from incompletion of the deactivation prohibited processing, when outputting the deactivating signals to the virtual machines, the deactivator may deactivate a virtual machine among the one or more virtual machines that does not output the deactivation prohibiting signal, may not deactivate a virtual machine among the one or more virtual machines that outputs the deactivation prohibiting signal and does not start the abnormality removal, and may deactivate a virtual machine, among the one or more virtual machines that outputs the deactivation prohibiting signal and starts the abnormality removal, after completion of the abnormality removal, and the abnormality removal may be completed earlier than the deactivation prohibited processing that is being executed by a virtual machine among the one or more virtual machines that executes the abnormality removal, when executed at the same priority of execution as the deactivation prohibited processing.

Such a structure enables the virtual machine executing the deactivation prohibited processing to be placed in a deactivatable state earlier, by completing the deactivation prohibited processing, than when a state of the virtual machine becomes deactivatable.

(e) When executing the abnormality removal, the abnormality removal unit may execute the abnormality removal at the highest priority of execution among processing executed by the virtual machine.

Such a structure enables the virtual machine executing the deactivation prohibited processing to further reduce a time period that elapses until the virtual machine is placed in the deactivatable state by executing the abnormality removal.

(f) The processor may utilize the device through a communication path between the processor and the device, and the abnormality removal may include transmission of a signal that unilaterally notifies the communication path that communication ends.

Such a structure enables the virtual machine performing communication with the device to be placed in a deactivatable state earlier, by completing the communication, than when a state of the virtual machine becomes deactivatable.

(g) The device may be a storage device that stores therein data utilized by the processor, the deactivation prohibited processing may include updating of file system management information in the device and writing of data in the device, and the abnormality removal may include the updating and does not include the writing.

Such a structure enables the virtual machine executing processing including updating of the file system management information in the device and writing of data in the device, as the deactivation prohibited processing, to be placed in a deactivatable state earlier, by completing the processing, than when a state of the virtual machine becomes deactivatable.

(h) The device may be a storage device that stores therein data utilized by the processor, the deactivator may include a state storage unit that stores therein information pertaining to a state of the device, and the abnormality removal may include storing the information pertaining to the state of the device in the state storage unit.

Such a structure enables the virtual machine executing writing of the data in the device as the deactivation prohibited processing to be placed in a deactivatable state earlier, by completing writing, than when a state of the virtual machine becomes deactivatable.

(i) Also, the virtual machine system may comprise a power controller that controls power supplied to the processor, wherein the deactivator may include a power stop unit that causes, when all of the virtual machines implemented by the processor stop operating, the processor to transmits, to the power controller, a power stopping signal indicating that power supplied to the processor is to be stopped, and when the power stopping signal is transmitted from the processor, the power controller may stop the power supplied to the processor.

With such a structure, when all of the virtual machines stop operating, it is possible to stop power supplied to the processor and the device so as to reduce power consumption of the processor and the device.

INDUSTRIAL APPLICABILITY

The present invention is broadly applicable to virtual machine systems.

REFERENCE SIGNS LIST 100 virtual machine system
110 integrated circuit
120 processor
130 memory
160 power control device
170 clock generator
180 first device
190 second device
200 module group
210 hypervisor
211 execution control unit
212 VM scheduler
213 power control unit
220 first virtual machine
240 first OS
241 scheduler
242 deactivation control unit
243 power event reception unit
244 execution control unit
250 first device driver
251 device control unit
252 device state management unit
253 state flag storage unit
254 control information storage unit
255 deactivation prohibited processing information storage unit

The invention claimed is:

1. A virtual machine system for implementing one or more virtual machines and a deactivator that deactivates the one or more virtual machines, the virtual machine system comprising:

a processor utilizing a device; and a memory storing therein a program executed by the processor, the virtual machine system causing the processor to execute the program stored in the memory to implement the one or more virtual machines and the deactivator, wherein the deactivator includes a deactivating signal output unit that outputs a deactivating signal to each of the one of more virtual machines, the deactivating signal instructing each of the one or more virtual machines to stop operating, each of the one or more virtual machines includes an output unit that outputs, in response to receiving the deactivating signal output from the deactivating signal output unit, a deactivation prohibiting signal while the virtual machine is executing deactivation prohibited processing, the deactivation prohibited processing being processing that involves the device and during which the virtual machine is not permitted to stop operating, the deactivation prohibiting signal indicating that the virtual machine is not permitted to stop operating, the deactivator (i) deactivates a virtual machine that does not output the deactivation prohibiting signal in response to receiving the deactivating signal output from the deactivating signal output unit, and (ii) does not deactivate a virtual machine that outputs the deactivation prohibiting signal in response to receiving the deactivating signal output from the deactivating signal output unit, each of the one or more virtual machines includes a processing time reducing unit that, when the virtual machine is executing the deactivation prohibited processing in response to receiving the deactivating signal output from the deactivating signal output unit, performs processing time reduction processing of reducing processing time required until termination of the deactivation prohibited processing, the deactivation prohibited processing includes update processing involving at least one of (i) processing that, when terminated due to interruption, physically damages the device and (ii) processing that, when terminated due to interruption, disables correct reading of data from the device, the processing time reduction processing is executable when the update processing has not been completed, and the processing time reduction processing terminates the deactivation prohibited processing even when the deactivation prohibited processing has not completed and starts execution of recovery processing at highest execution priority, the recovery processing only including the update processing associated therewith among the deactivation prohibited processing.

2. The virtual machine system of claim 1, further comprising:

a power controller that controls power supplied to the processor, wherein the deactivator includes a power stop unit that causes, when all of the virtual machines implemented by the processor stop operating, the processor to transmit, to the power controller, a power stopping signal indicating that power supplied to the processor is to be stopped, and when the power stopping signal is transmitted from the processor, the power controller stops the power supplied to the processor.

3. A virtual machine system control method for controlling a virtual machine system for implementing one or more virtual machines and a deactivator that deactivates the one or more virtual machines, the virtual machine system including (i) a processor utilizing a device, and (ii) a memory storing therein a program executed by the processor, the virtual machine system causing the processor to execute the program stored in the memory to implement the one or more virtual machines and the deactivator, the virtual machine system control method comprising:

outputting a deactivating signal from the deactivator to each of the one of more virtual machines, the deactivating signal instructing each of the one or more virtual machines to stop operating;

outputting, from each of the one or more virtual machines to the deactivator in response to receiving the deactivating signal from the deactivator, a deactivation prohibiting signal while the virtual machine is executing deactivation prohibited processing, the deactivation prohibited processing being processing that involves the device and during which the virtual machine is not permitted to stop operating, the deactivation prohibiting signal indicating that the virtual machine is not permitted to stop operating;

causing the deactivator to (i) deactivate a virtual machine that does not output the deactivation prohibiting signal in response to receiving the deactivating signal output from the deactivator, and (ii) does not deactivate a virtual machine that outputs the deactivation prohibiting signal in response to receiving the deactivating signal output from deactivator; and performing, for each of the one or more virtual machines when the virtual machine is executing the deactivation prohibited processing in response to receiving the deactivating signal output from the deactivator, processing time reduction processing of reducing processing time required until termination of the deactivation prohibited processing, wherein the deactivation prohibited processing includes update processing involving at least one of (i) processing that, when terminated due to interruption, physically damages the device and (ii) processing that, when terminated due to interruption, disables correct reading of data from the device, the processing time reduction processing is executable when the update processing has not been completed, and the processing time reduction processing terminates the deactivation prohibited processing even when the deactivation prohibited processing has not completed and starts execution of recovery processing at highest execution priority, the recovery processing only including the update processing associated therewith among the deactivation prohibited processing.

4. A non-transitory computer readable recoding medium having stored thereon a virtual machine system control program for causing a virtual machine system implementing one or more virtual machines and a deactivator that deactivates the one or more virtual machines to execute a virtual machine system control processing of controlling the virtual machine system, the virtual machine system including (i) a processor utilizing a device, and (ii) a memory storing therein a program executed by the processor, the virtual machine system causing the processor to execute the program stored in the memory to implement the one or more virtual machines and the deactivator, the virtual machine system control processing comprising:

outputting a deactivating signal from the deactivator to each of the one of more virtual machines, the deactivating signal instructing each of the one or more virtual machines to stop operating;

outputting, from each of the one or more virtual machines to the deactivator in response to receiving the deactivating signal from the deactivator, a deactivation prohibiting signal while the virtual machine is executing deactivation prohibited processing, the deactivation prohibited processing being processing that involves the device and during which the virtual machine is not permitted to stop operating, the deactivation prohibiting signal indicating that the virtual machine is not permitted to stop operating;

causing the deactivator to (i) deactivate a virtual machine that does not output the deactivation prohibiting signal in response to receiving the deactivating signal output from the deactivator, and (ii) does not deactivate a virtual machine that outputs the deactivation prohibiting signal in response to receiving the deactivating signal output from deactivator; and performing, for each of the one or more virtual machines when the virtual machine is executing the deactivation prohibited processing in response to receiving the deactivating signal output from the deactivator, processing time reduction processing of reducing processing time required until termination of the deactivation prohibited processing, wherein the deactivation prohibited processing includes update processing involving at least one of (i) processing that, when terminated due to interruption, physically damages the device and (ii) processing that, when terminated due to interruption, disables correct reading of data from the device, the processing time reduction processing is executable when the update processing has been not completed, and the processing time reduction processing terminates the deactivation prohibited processing even when the deactivation prohibited processing has not completed and starts execution of recovery processing at highest execution priority, the recovery processing only including the update processing associated therewith among the deactivation prohibited processing.

\* \* \* \* \*